United States Patent
Mori et al.

(10) Patent No.: US 6,898,421 B2
(45) Date of Patent: May 24, 2005

(54) SERVICE PROVIDING APPARATUS AND METHOD, AND SERVICE VERIFYING APPARATUS USING INFORMATION TERMINAL

(75) Inventors: Shinichiro Mori, Kawasaki (JP); Kenji Nakamura, Kawasaki (JP); Eiichi Tanaka, Kawasaki (JP); Ken Hayashida, Kawasaki (JP); Hirokazu Tsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 641 days.

(21) Appl. No.: 09/821,440

(22) Filed: Mar. 29, 2001

(65) Prior Publication Data

US 2001/0053685 A1 Dec. 20, 2001

(30) Foreign Application Priority Data

Jun. 14, 2000 (JP) ........................ 2000-178503
Nov. 17, 2000 (JP) ........................ 2000-351539

(51) Int. Cl.$^7$ .................... H04M 1/66; G06K 5/00; G06F 17/60
(52) U.S. Cl. .................... 455/411; 235/382; 705/42
(58) Field of Search .................... 364/408; 235/382; 455/411; 705/42

(56) References Cited

U.S. PATENT DOCUMENTS 5,025,373 A * 6/1991 Keyser et al. ................ 705/42
5,095,196 A * 3/1992 Miyata ....................... 235/382

FOREIGN PATENT DOCUMENTS

EP 0 926 611 6/1999
WO 99/44114 9/1999

* cited by examiner

Primary Examiner—William Cumming
(74) Attorney, Agent, or Firm—Katten Muchin Zavis Rosenman

(57) ABSTRACT

A service providing apparatus includes personal data specifying means for specifying personal data of a user of a mobile terminal based on user identification (ID) information received from the mobile terminal via a first line and terminal ID information received from the mobile terminal via a second line, and service executing means for executing a desired service for the user based on the personal data specified by the personal data specifying means. As a result, the user of a receiver for WEB service using the mobile terminal, such as a mobile telephone, is correctly specified (verified) in security by the service providing apparatus (e.g., a call center) without using a dedicated encoding technique, such as SSL (Secure Socket Layer).

20 Claims, 14 Drawing Sheets

25a: PHONE-TO DETECTING SECT.
26a: CALL-OUT CONTROL SECT.
26b: ENTRY CODE RECEIVING SECT.
26c: ENTRY CODE NOTIFYING SECT.
26d: USER ID SENDING SECT.
26e: CALLER NUMBER NOTIFYING SECT.

31a: VERIFYING SECT.
(PERSONAL DATA SPECIFYING SECT.)
32a: ENTRY CODE CREATING SECT.
32b: ENTRY CODE SENDING SECT.
32c: RELATING SECT.
32d: SPECIFYING SECT.

| USER ID | MOBILE TELEPHONE NUMBER | E-MAIL ADDRESS | BANK ACCOUNT NUMBER | ... |
|---------|-------------------------|----------------|---------------------|-----|
| 5656 | 090-1234-5678 | xxxx@aa.bb.ne.jp | 123455678 | |
| ⋮ | ⋮ | ⋮ | ⋮ | ⋮ |
| 1234 | 090-1111-2222 | yyyy@cc.dd.com | 111222333 | ... |

| ENTRY CODE | USER ID | INPUT-BY-USER CONTENTS (PROVIDING CONTENTS) |
|------------|---------|----------------------------------------------|
| 4216 | 5656 | "RETRIEVING SHARE PRICE" CONTENTS |
| 4220 | 5656 | "PURCHASING SHARE" CONTENTS |
| ⋮ | ⋮ | ⋮ |

25a: PHONE-TO DETECTING SECT.
26a: CALL-OUT CONTROL SECTION
26b: ENTRY CODE RECEIVING SECT.
26c: ENTRY CODE NOTIFYING SECT.
26d: USER ID SENDING SECT.
26e: CALLER NUMBER NOTIFYING SECT.

31a: VERIFYING SECT.
(PERSONAL DATA SPECIFYING SECT.)
32e: ENTRY CODE CREATING SECT.
32f: RELATING SECT.
38a: ENTRY CODE SENDING SECT.
38b: SPECIFYING SECT.

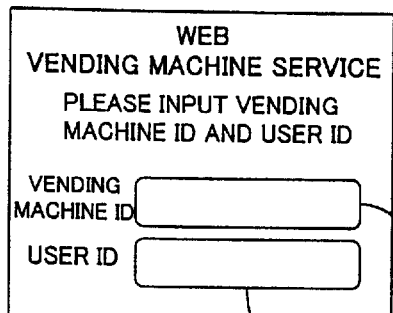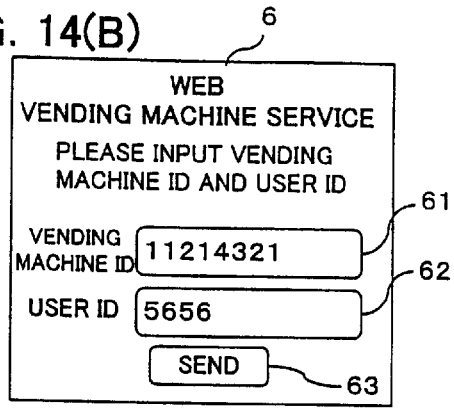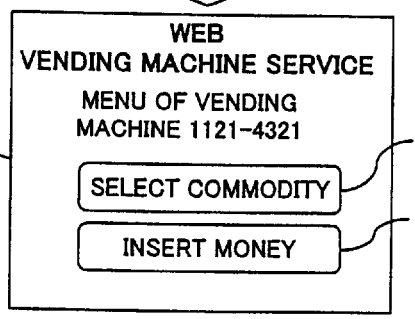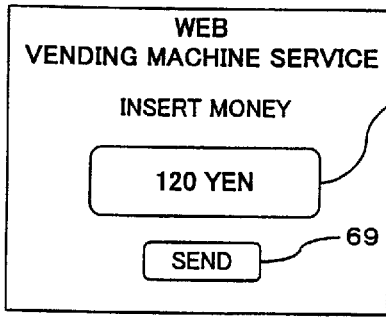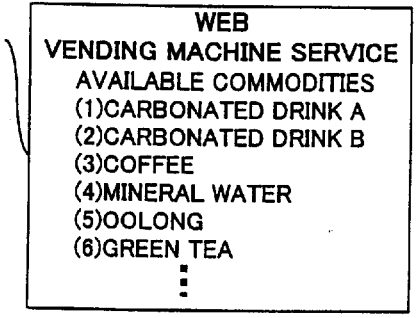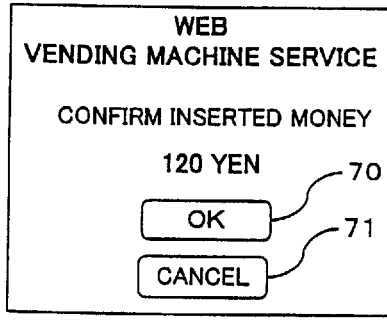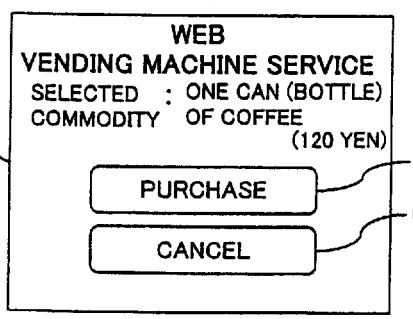

SERVICE PROVIDING APPARATUS AND METHOD, AND SERVICE VERIFYING APPARATUS USING INFORMATION TERMINAL

BACKGROUND OF THE INVENTION

1. Field of the Invention

The present invention relates to a technology preferably applied to service in connection with a mobile radio terminal (information terminal), such as a mobile telephone, and a service providing apparatus, such as a call (or customer) center. More particularly, the present invention relates to a service providing apparatus, which service is performed using an information terminal, a method for providing such service, a method for purchasing a commodity using an information terminal, and an information terminal.

2. Description of the Related Art

In accordance with a recent severe competition in providing service, a CTI (Computer Telephony Integration) system, in which a computer is highly connected in operations with telephones, has been regarded highly. The CTI system intends to improve service to a customer mainly by efficiently executing inquiries and receiving orders of an inquiry or an order receipt from the customers in a call center, and is now brought into practice.

In a CTI system, when a customer makes a telephone call to a call center (an operator terminal (computer)), the customer is specified based on calling number notification information and then information about the user is displayed on a screen of the operational terminal (e.g., in the form of a pop-up screen) by retrieving the information about the customer in a information managing system, such as a customer database. Therefore, since an operator responds to the customer over the telephone with reference to the information about the customer, it is possible to provide smooth and careful service to the customer.

Nowadays, with a drastic spread of mobile telephones, it is becoming common to make a phone call to a call center using a mobile telephone. Latest mobile telephones are used for not only voice communication but also data communication, such as browsing the information (contents) of URLs (Uniform Resource Locations) in the form of HTML (Hyper Text Markup Language) documents over the Internet (WWW (World Wide Web)).

As a result, many people are recently positively approaching an execution of various online trading (e-commerce; electric commerce), such as a reservation/sale of a ticket or a deal of a share, on WEB using a mobile telephone. At that time, the each customer has to be correctly specified upon receipt of such WEB service. It is mainstream that the customer is specified (verified) by inputting a password which has been previously registered in a service provider upon member registration.

However, when such password is communicated via the Internet (the Internet line), to which any unspecified user can make an access without scrambling it in accordance with encryption communication protocol, such as SSL (Secure Socket Layer) as known widely, there is a possibility that the password can be easily read by unauthorized individuals. Therefore, it is a cause of great concern in a security problem.

It is preferable that encode/decode means which realize a scramble process, such as SSL, are installed in a mobile telephone as ordinary personal computers so that a customer receives the WEB service, which requires to be verified a customer using a mobile telephone with relief. However, considering the capacity of CPU of the modern mobile telephone, it is very difficult to realize.

As a solution, it may be proposed that the calling number notification information of the mobile telephone is used for verifying the customer. However, since the telephone number of mobile telephone is usually reused when a subscribe use is changed to a new user, two or more different customers may share an identical calling number notification information if the telephone number is reused. It is impossible to correctly specify a user using only the calling number notification information.

Further, since the WEB service is not connected with voice communication service at a call center in the present day, the call center is incapable of recognizing which information is input by the customer by using which contents. With such system, if the customer calls the call center from a mobile telephone to, for example, make a query about a certain service, an operator at the call center never knows for which contents (WEB service) the customer calls the call center. Therefore the operator cannot provide the customer with smooth and careful voice communication service in accordance with a request of the customer.

SUMMARY OF THE INVENTION

With the foregoing problems in view, it is an object of the present invention to provide an apparatus and a method for correctly specifying (verifying) personal data of a customer (user) who uses WEB service using a mobile terminal, such as a mobile telephone, in a service providing apparatus (e.g., call center) safely without using a dedicated encoding technique, such as SSL (Secure Socket Layer). It is another object of the present invention to provide an apparatus and a method for extending service based on information input by the user and contents having been provided for the user.

To attain the above-mentioned objects, according to a first generic feature of the present invention, there is provided a service providing apparatus using both previously registered user identification (ID) information about a user of an information terminal and previously registered terminal ID information peculiar to the information terminal, the apparatus comprising: personal data specifying means for specifying personal data of the user of the information terminal based on both the user ID information received from the information terminal via a first line and the terminal ID information received from the information terminal via a second line; and service executing means, responsive to the specifying means, for executing a desired service for the user based on the personal data specified by the personal data specifying means.

As a second generic feature, there is provided a service providing method using an information terminal, the method comprising the steps of: at a service providing apparatus, (a) creating an individual code peculiar to user input information, which is inputted to an information terminal in accordance with a service requested by a user of the information terminal and is received from the information terminal via a first line; (b) sending the individual code, which has been created in the individual code creating step (a), to the information terminal via the first line; at the information terminal, (c) notifying the service providing apparatus of the individual code, which has been received from the service providing apparatus via the first line, via a second line; at the service providing apparatus, (d) specifying user input information corresponding to the individual code, which is notified by the information terminal via the second line; and (e) executing a desired service for the user of the information terminal based on the user input information specified in the user input information specifying step (d).

Further, as a third generic feature, there is provided a service providing method using an information terminal, the method comprising the steps of: at a service providing apparatus using both previously registered user identification (ID) information about a user of an information terminal and previously registered terminal ID information peculiar to the information terminal, (a) creating an individual code peculiar to user input information, which has been inputted to the information terminal in accordance with a service requested by the user of the information terminal and has been received from the information terminal via a first line; (b) sending the individual code, which has been created in the individual code creating step (a), to the information terminal via the first line; at the information terminal, (c) notifying the service providing apparatus of the individual code, which has been received from the service providing apparatus via the first line, via a second line; at the service providing apparatus, (d) specifying user input information corresponding to the individual code, which has been notified by the information terminal via the second line; (e) specifying personal data of the user of the information terminal, based on both the user ID information received from the information terminal via the first line and the terminal ID information received from the information terminal via the second line; and (f) executing a desired service for the user of the information terminal based on both the user input information specified in the user input information specifying step (d) and the personal data specified in the personal data specifying step (e).

As a fourth generic feature, there is provided a service providing apparatus for an information terminal, the apparatus comprising: individual code creating means for creating an individual code peculiar to user input information, which has been inputted to the information terminal in accordance with a service requested by a user of the information terminal and has been received from the information terminal via a first line, individual code sending means for sending the individual code, which has been created by the individual code creating means, to the information terminal via the first line; user input information specifying means for specifying user input information corresponding to the individual code, which is notified by the information terminal via a second line; and service executing means for executing a desired service for the user of the information terminal based on the user input information specified by the user input information specifying means.

As a fifth generic feature, there is provided an information terminal comprising: individual code receiving means for receiving an individual code peculiar to user input information, which has been inputted to the information terminal in accordance with a service requested by a user of the information terminal, the individual code having been created in a service providing apparatus and sent to the information terminal via the first line; and individual code notifying means for notifying the service providing apparatus of the individual code, which has been received by the individual code receiving means, via a second line so that the service providing apparatus specifies the user input information based on the individual code.

As a sixth feature, there is provided a service providing method using an information terminal, the method comprising the steps of: at a service providing apparatus, (a) creating an individual code peculiar to providing information for the information terminal; (b) sending the individual code, which has been created in the individual code creating step (a), together with the providing information to the information terminal via a first line; at the information terminal, (c) notifying the service providing apparatus of the individual code, which has been received from the service providing apparatus via the first line, via a second line; at the service providing apparatus, (d) specifying providing information corresponding to the individual code notified by the information terminal via the second line; and (e) executing a desired service based on the providing information specified in the providing information specifying step (d).

Still further, as a seventh generic feature, there is provided a service providing method using an information terminal, the method comprising the steps of: at a service providing apparatus using both previously registered user identification (ID) information about a user of an information terminal and previously registered terminal ID information peculiar to the information terminal, (a) creating an individual code peculiar to providing information for the information terminal; (b) sending the individual code, which has been created in the individual code creating step (a), together with the providing information to the information terminal via a first line; at the information terminal, (c) notifying the service providing apparatus of the individual code, which has been received from the service providing apparatus via the first line, via a second line; at the service providing apparatus, (d) specifying providing information corresponding to the individual code, which has been notified by the information terminal via the second line; (e) specifying personal data of the user of the information terminal based on both the user ID information received from the information terminal via the first line and the terminal ID information received from the information terminal via the second line; and (f) executing a desired service based on both the providing information specified in the providing information specifying step (d) and the personal data specified in the personal data specifying step (e).

As an eighth generic feature, there is provided a service providing apparatus for an information terminal, the apparatus comprising: individual code creating means for creating an individual code peculiar to providing information for the information terminal; individual code sending means for sending the individual code, which has been created by the individual code creating means, to the information terminal via a first line; providing information specifying means for specifying providing information corresponding to the individual code, which has been notified by the information terminal via a second line; and service executing means for executing a desired service based on the providing information specified by the providing information specifying means.

As a ninth generic feature, there is provided an information terminal comprising: individual code receiving means for receiving an individual code peculiar to providing information for the information terminal, which code has been created in a service providing apparatus and has been received together with the providing information from the service providing apparatus via a first line; and individual code notifying means for notifying the service providing apparatus of the individual code, which has been received by the individual code receiving means, via a second line so that the service providing apparatus specifies the providing information based on the individual code.

As a tenth generic feature, there is provided an information terminal comprising: user identification (ID) information sending means for sending user ID information about a service, which is to be provided, to a verifying unit which discriminates whether a desired service should be provided for the information terminal, via a first line; and terminal ID information sending means for sending terminal ID information to the verifying unit via a second line.

As a preferable feature, the service to be provided may be a settlement service with respect to a price of a commodity that a user of the information terminal intends to buy.

As an eleventh generic feature, there is provided a service verifying apparatus for verifying use of a service performed by using an information terminal based on user identification (ID) information and terminal ID information, which are received from the information terminal.

As a preferable feature, the service verifying apparatus may comprise a user registration information managing means for managing, as user registration information about a user of the information terminal with respect to a service requested by the user, user identification (ID) information and terminal ID information peculiar to the information terminal; and verifying means for verifying the use of the service requested by the user by collating user ID information, which has been received from the information terminal via a first line, and terminal ID information, which has been received from the information terminal via a second line, with the user registration information, which is managed in the user registration information managing means.

As a twelfth generic feature, there is provided a service providing apparatus for an information terminal wherein a service requested by a user of an information terminal is provided for the user responsive to a result of verification performed by the above-mentioned service verifying apparatus.

As a preferable feature, the service providing apparatus may be a settlement agent apparatus, responsive to the result of verification, for executing a settlement service with respect to a price of a commodity that the user of the information terminal intends to buy, or may be a commodity selling apparatus, responsive to the result of verification, for executing a commodity selling service.

As a thirteenth generic feature, there is provided a method of buying a commodity using an information terminal, comprising the steps of: at the information terminal, (a) requesting a settlement agent apparatus for use of a settlement service with respect to a price of a commodity that the user of the information terminal intends to buy; (b) sending user identification (ID) information to the settlement agent apparatus via a first line; (c) sending terminal ID information of the information terminal to the settlement agent apparatus via a second line; at the settlement agent apparatus, (d) verifying the use of the settlement service by collating the user ID information, which has been received from the information terminal via the first line, and the terminal ID information, which has been received from the information terminal via the second line, with previously registered user registration information about the settlement service; and (e) notifying a settlement apparatus of the result of verification in the verifying step (d) so that the settlement apparatus settles the price of the commodity based on the result of verification.

As a preferable feature, the settlement apparatus may be of a commodity selling apparatus, responsive to the result of verification, for ejecting a commodity or for becoming a state that money is inserted.

As a fourteenth generic feature, there is provided a service providing method using an information terminal, comprising the steps of: at the information terminal, (a) sending at least two kinds of information, which are needed for use of a desired service, to a service providing apparatus via respective different lines; and at the service providing apparatus, (b) executing the service based on the information, which have been received from the information terminal, via the respective different lines.

As a fifteenth generic feature, there is provided a service providing apparatus for an information terminal, comprising: means for receiving at least two kinds of information, which are needed for use of a desired service, from the information terminal via respective different lines; and means for executing the service based on the individual kinds of information, which have been received from the information terminal via the respective different lines.

As a sixteenth generic feature, there is provided an information terminal equipped with means for sending at least two kinds of information, which are needed for use of a desired service, to a service providing apparatus via respective different lines.

In these generic features of the present invention, since the personal data of the user of an information terminal is specified (the use of the service is verified) based on both the user ID information received via the first line and the terminal ID information received from the second line, it is possible to correctly verify the use of the service for the user even if the telephone number of the information terminal is reused by a person other than the intended user. Further, since a part of information (the terminal ID information) needed for verification of the user is received from the information terminal via a different line from a line through which other piece of the needed information (e.g., the user ID information) is received, it is possible to prevent the information from being stolen and being decoded the information by a third person. As a result, it is possible to improve verification of a user safely without using a dedicated encoding technique.

With the information terminal used in the present invention, it is possible to correctly and safely verify the user by only installing means for sending the user ID information and the terminal ID information via respective different lines in the information terminal, without a dedicated encoding technique, such as SSL.

When the service, of which the verification for the use is performed, is a settlement service with respect to a price of a commodity that a user of the information terminal intends to buy, the user of the information terminal can buy any commodity sold in a commodity selling machine using the information terminal as a substitution for a purse or a credit card.

Since the user input information from the information terminal (or the providing information) is specified based on an individual code, which has been created peculiar to the user input information (or providing information for the information terminal), it is possible to provide the user with a smooth and careful service in accordance with the user input information (or the providing information).

Further, since the service is provided for the user of the information terminal based on a combination of the result of the verification of the user and the user input information (or the providing information), it is possible to improve the service to the user.

Other objects and further features of the present invention will be apparent from the following detailed description when read in conjunction with the accompanying drawings.

BRIEF DESCRIPTION OF THE DRAWINGS

FIG. 3(A) is a diagram showing an example of a member registration database according to the embodiment;

FIG. 3(B) is a diagram showing an example of a corresponding table according to the embodiment;

FIGS. 14(A) through 14(G) are diagrams respectively showing a screen of a mobile telephone in which data for providing service is displayed in WEB free system of FIG. 11.

DESCRIPTION OF THE PREFERRED EMBODIMENTS

Various preferred embodiments of the present invention will now be described with reference to the accompanying drawings.

(A) First Embodiment

Figure 1:
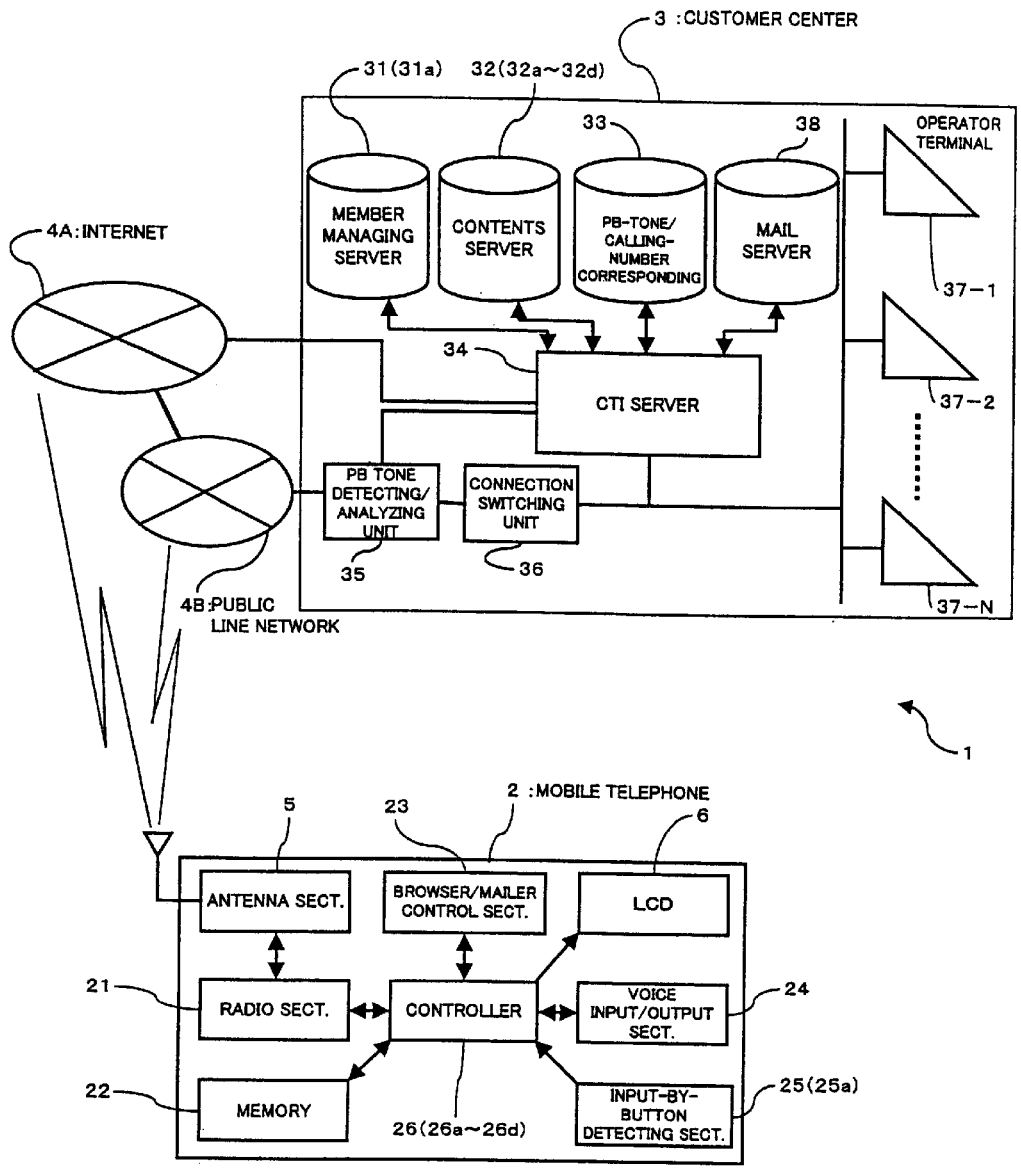
FIG. 1 is a block diagram schematically showing a WEB free system according to a first embodiment of the present invention.

FIG. 1 is a block diagram schematically showing a WEB free system 1 according to a first embodiment of the present invention. In the WEB free system 1 (hereinafter also called "system 1") of FIG. 1, for example, a user makes an access to WEB contents, which is managed by a customer (call) center 3 of a service providing apparatus, using a mobile telephone (mobile radio terminal) 2 via Internet (Internet communication line; a first communication line) 4A as an information terminal so as to browse WEB data on the mobile telephone 2. And, the user makes a phone call to the customer center 3 using the mobile terminal 2 via a public line network (a second communication line, hereinafter also called "public line") 4B using the mobile telephone 2.

Figure 2:
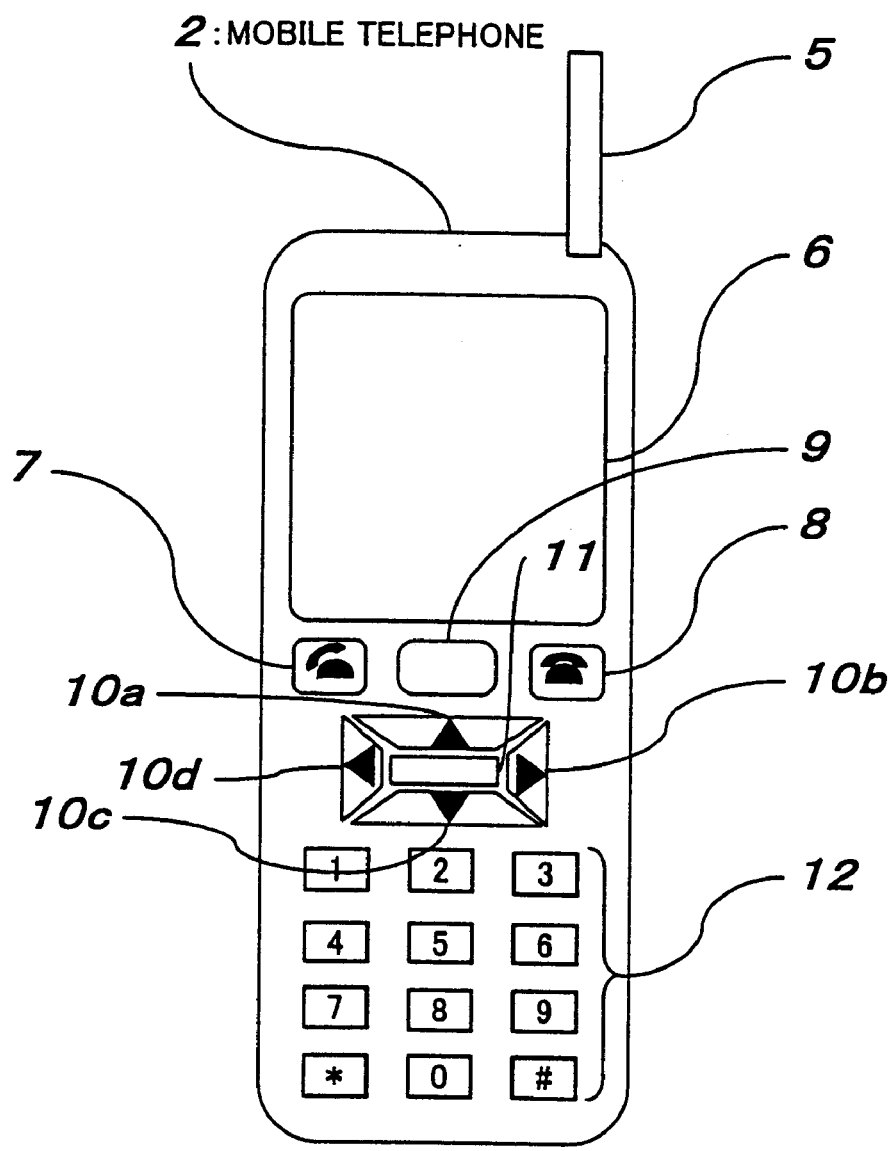
FIG. 2 is a front view schematically showing a mobile telephone included in the WEB free system of FIG. 1.

FIG. 2 is a front view schematically showing the mobile telephone 2 included in the WEB free system 1. Throughout this description, the term "Internet line" means data communication line in which a communication is performed via the Internet 4A, to which unspecified users (third parties) can access. Conversely, the term "public line" means a voice or/and data communication line in which communication is performed by a point-to-point connection and, differently from the Internet 4A, which do not allow to be accessed by one or more unspecified users (third parties).

Elements of the mobile telephone 2 and the customer center (hereinafter simply called "center") 3 will now be described.

The center 3 includes a member managing server 31, a contents server 32, a push-button-tone (PB-tone)/calling-number corresponding server 33, a mail server 38, a CTI server 34, a PB tone detecting/analyzing unit 35, a connection switching unit 36 and operator terminals 37-1 through 37-N (N is natural number), as shown in FIG. 1. The operator terminals 37-1 through 37-N is used by call attendants.

The member managing server 31 manages information (personal information; personal data) peculiar to a user (hereinafter also called a individual person), which receives various services (online trading; WEB service), such as purchasing a ticket or exchanging a certificate, on the WEB via the mobile telephone 2. The personal data is managed as member (user) registration information by creating a database.

The personal data is the telephone number of the mobile telephone 2, user identification (ID) (user specifying information), the number of a bank account, in which a direct debit of the price regarding tollable WEB service is made, and an e-mail address. The member managing server 31, as shown in FIG. 3(A), retains and manages the various personal data of every individual persons in the form of a table as a member managing database (user registration information managing section) 311.

The "user ID" peculiar to each user may be independently defined by the user or may be assigned by a service provider. In the illustrated embodiment, it is assumed that the member managing server 31 retains the user ID independently defined by the user (at user's free choice).

The member managing server 31 also functions as a verifying section (personal data specifying section) 31a for performing a specifying process to specify personal data of a user going to receive WEB service via the mobile telephone 2 based on the member registration information. As described later, the authentication process is performed by use of combination of the user ID, which is received via the Internet communication line 4A, and the telephone number (calling number notification information; terminal identification information (terminal ID)) peculiar to the mobile telephone 2, which is notified via the public line 4B, in the illustrated example.

The contents server 32 manages WEB contents corresponding to the WEB service. For example, when the WEB service provides exchanging certification service, contents retained in the contents server 32 would be for share price retrieving service and share purchasing service. In addition to such function, the contents server 32 of the illustrated embodiment also has the following functions (1) through (5) so as to specify contents browsed by the user:

(1) Upon receipt of information input by the user (user input information, hereinafter called input-by-user information; e.g., information for retrieving share price or for purchasing share) on a WEB displaying screen (contents provided by the center 3) in accordance with service requested by the user, via the Internet communication line 4A, the contents server 32 functions as an entry code creating section 32a for automatically creating an "entry code" peculiar to individual contents (input-by-user contents) to which the user input information.

(2) The contents server 32 functions as an entry code sending section 32b for sending the "entry code", which is generated by the entry code creating section 32a, to the mobile telephone 2 via the Internet communication line 4A by attaching the entry code to contents (WEB data) corresponding to the service requested by the user.

(3) The contents server 32 functions as a relating section 32c for creating a corresponding table 321 in which an "entry code" is corresponding to a specific "user ID"

and "providing contents (input-by-user information)" by relating the "entry code" with the "user ID" as schematically shown in FIG. 3(B).

(4) The contents server 32 functions as an input-by-user information specifying section (user input information specifying section, hereinafter also called "specifying section") 32d for specifying "input-by-user information" corresponding to the "entry code", which is notified from the mobile telephone 2 in the form of PB tone via the public line 4B.

The PB-tone/calling-number corresponding server 33 notifies the member managing server 31 and/or the contents server 32 of PB operating information or call-out information (calling number notification information) of the mobile telephone 2 in accordance with destination telephone number information. Both the PB operating information and the calling number notification information have been received in PB tone from the mobile telephone 2 via the public line 4B, and have been detected or analyzed in the PB tone detecting/analyzing unit 35. Particularly, the PB operating information is output as the "entry code" from the PB tone detecting/analyzing unit 35.

The mail server 38 stores and manages e-mails communicated with the mobile telephone 2 and sends e-mails based on the destination e-mail account. The mail server 38 responds to mail of not only text format but also HTML (hyper text markup language) format. As a result, the mail server 31 is capable of providing the mobile telephone 2 via CTI server 34 with the same matter as WEB data (contents) of HTML format which the data is managed by the contents server 32 by e-mail.

The CTI server 34 (service providing unit) associates voice communication service with WEB service and mail service between the mobile telephone 2 and the operator terminal 37-i (i=1 through N) by operating in connection with the member managing server 31, the contents server 32, the PB-tone/caller-number corresponding server 33, and the mail server 38. In the illustrated embodiment, the CTI server 34 outputs personal data of the user specified by the specifying process by the verifying section 31a and input-by-user information on the WEB (contents accessed by the user) to the operation terminal 37-i so that voice communication service (corresponding to the request by the user) based on the output information is provided the user. The CTI server also functions as a service providing section for making a direct debit of the price regarding the service provided a user in the user's account previously designated by the user.

The PB tone detecting/analyzing unit 35 obtains PB operating information of the mobile telephone 2 by detecting and analyzing PB tone received via public line 4B. The connection switching unit 36 decides a connection destination (the operator terminal 37-i) of a call-out operation of the mobile telephone 2 via the public line 4B.

The mobile telephone 2 of FIG. 2 is equipped with an antenna section 5, a liquid crystal display (hereinafter also called LCD) 6, a power/talk button 7, a hang-up/hold-on button 8, a display-changeover button 9, cursor buttons 10a through 10d, a decision button 11, and a keypad 12.

The antenna section 5 transmits and receives data, such as audio data of a voice communication, an e-mail of data communication and WEB data in HTML format for a mobile telephone, via a radio communication system. The WEB data and an e-mail are transmitted and received via the Internet line 4A between the mobile telephone 2 and the center 3, and the audio data is transmitted and received via a public line 4B as formed of radio base stations and exchanges between the mobile telephone 2 and the center 3.

The liquid crystal display (data display section) 6 executes various displays such as a received e-mail, WEB data, state of transmit/receive and etc. The power/talk button 7 is used for turn on/off operations of the mobile telephone 2 and for call-up/access to a telephone number/a URL inputted from the keypad 12. The hang-up/hold-on button 8 is operated to make selectively disconnection of the mobile telephone 2 from the telephone line or a holding-on of the communication.

The display-changeover button 9 is used for screen changeover operation on the LCD 6. In this illustrated example, when the display-changeover button 9 is pressed after a transmitting (call-out) process is executed by a phone-to function, an e-mail or WEB data which has been displayed before the transmit process is redisplayed on the LCD 6.

The cursor buttons 10a through 10d are used for moving a cursor in the upward, downward, rightward and leftward directions on the LCD 6 when a telephone number, a URL, or a menu being displayed on the LCD 6 is going to be selected. In the illustrated example, moving the cursor by the cursor buttons 10a through 10d selects a telephone number or a URL attached to the data being displayed on the LCD 6 in the form of a hyperlink. Subsequently, pressing the decision button 11 with respect to the selected telephone number or the URL automatically carries out a call-out (an access) process to the telephone number or the URL.

Namely, the decision button 11 serves as both a phone-to button (a button for starting of a voice-communication) for realizing a phone-to function and a browsing button for accessing to a URL, which is attached to an e-mail or WEB data, to browse by a single click.

The keypad 12 is in the form the push buttons (PBs) for inputting telephone numbers and letters. The call-out process/access (data communication) to a telephone number or a URL inputted from the numeric keypad 9 is executed by pressing the power/talk button 7.

For these purpose, the mobile telephone 2 as shown in FIG. 1 is further equipped with a radio section 21, a memory 22, a browser/mailer control section 23, a voice input/output (I/O) section 24, an input-by-button detecting section 25, and a controller 26, as internal components in addition to the antenna section 5 and the LCD 6.

The radio section 21 up-converts the data (audio data, e-mail data or WEB data) to be transmitted to a radio frequency (RF) signal, and then transmits the RF signal. On the other hand, the radio section 21 also down-converts audio data, e-mail data or WEB data received as an RF signal to a baseband signal. The memory 22 stores necessary data, such as the e-mail data or the WEB data obtained by browsing the Internet.

The browser/mailer control section 23 controls the browsing of the Internet (an access to a URL) and sending/receiving e-mails (data communication). The voice I/O section 24 executes the input/output of voice during a voice communication, being in the form of a microphone, a speaker, etc. Operating buttons in a predetermined manner or connecting a headset to the mobile telephone 2 realizes hands free voice communication.

The input-by-button detecting section 25 detects whether the individual button, i.e. the power/talk button 7, the hang-up/hold-on button 8, the display-changeover button 9, the cursor buttons 10a through 10d, the decision button 11 or the keypad 12, is operated. The input-by-button detecting section 25 also detects the above-mentioned phone-to operation and an input operation of the "entry code", which is notified by the center 3, and the "user ID".

Namely, as shown in FIG. 2, the input-by-button detecting section 25 functions as a phone-to (selection/detection) detecting section 25a that detects a phone-to operation (selection and succeeding decision operation) with respect to telephone number information attached to the e-mail data or the WEB data being displayed on the data display section 6.

The controller 26 controls the radio section 21, the memory 22, the browser/mail control section 23, the LCD 6 and the voice I/O section 24 unitedly to thereby control the whole operation of the mobile telephone 2. Focusing on the whole operation, the mobile telephone 2 has various functions as follows:

(1) a call-out control section 26a for performing a call-out process with respect to a destination telephone number when a phone-to operation is detected by the phone-to detecting section 25a;

(2) an entry code receiving section 26b for receiving an "entry code", which is attached to WEB data send from the center 3 via the Internet line 4A;

(3) an entry code notifying section 26c for notifying, via public line 4B, the center 3 of the "entry code", which received by the entry code receiving section 26b, as information (the PB operation information) used for specifying the input-by-user information; and (4) a user ID sending section 26d for sending the member managing server 31, which verifies the use of service, a user ID with respect to the service via the Internet line 4A.

The call-out control section 26 also has a function of controlling calling number notification, which notifies a calling destination of the telephone number of the mobile telephone 2 by "calling number notification setting". Namely, the call-out control section 26a also functions as a calling number notifying (terminal ID sending) section 26e, which notifies the member managing server 31 of calling number notification information (terminal ID information) via the public line 4B. The calling number notification setting is carried out by operating a predetermined key (function key) by the user or adding a predetermined code (e.g., 186) to the fore part of a destination telephone number.

The user ID sending section 26d and the calling number notifying section 26e provides the center 3 with at least two kinds of information, which is required for service when the user wishes to receive the service, via different communication lines of the Internet line 4A and the public line 4B, respectively. Such information providing manner is substantially identical with those of later-described second and third embodiments.

Figure 4:
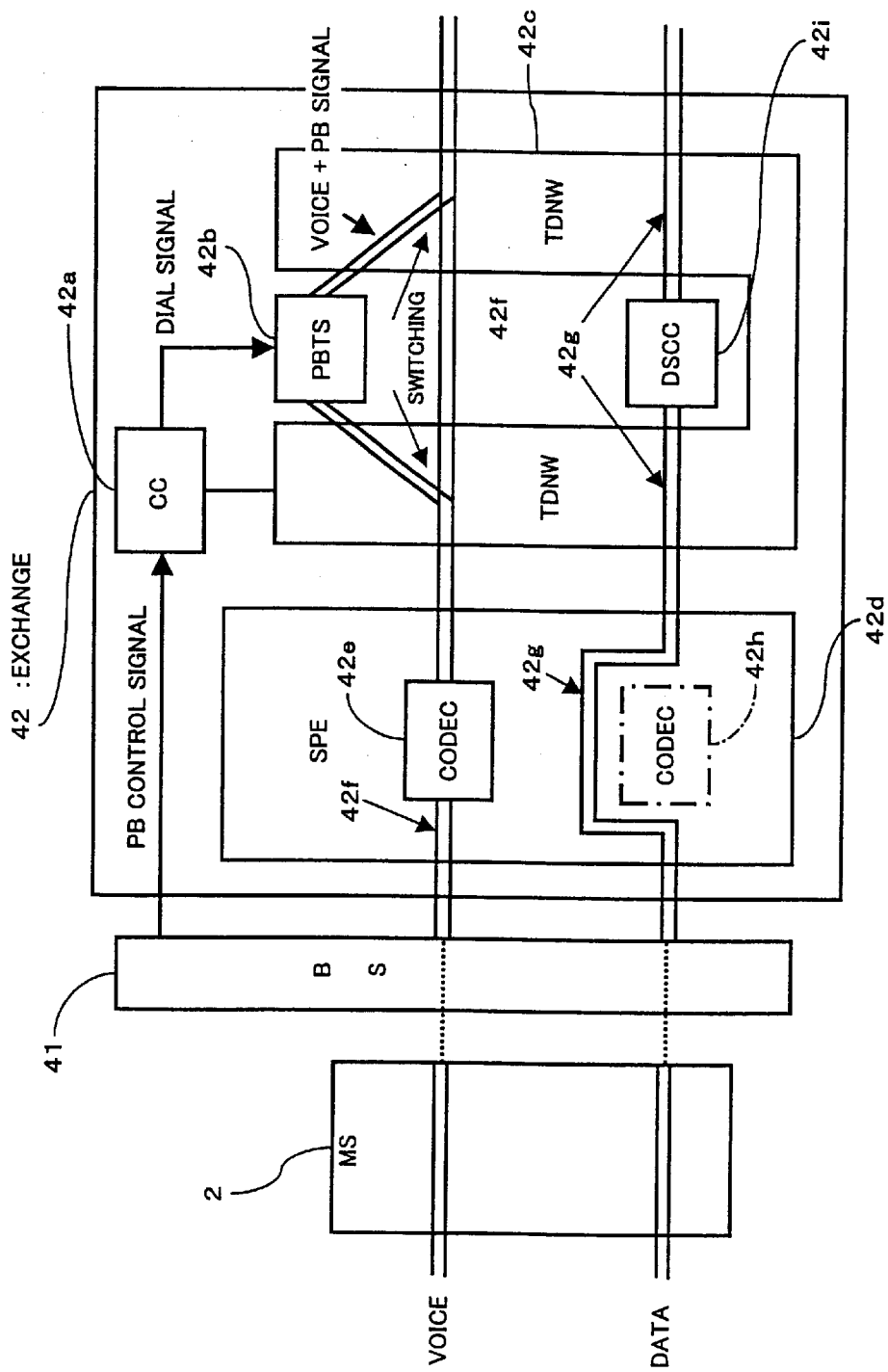
FIG. 4 is a block diagram schematically showing a radio base station and an exchange, which constitute a public line network included in the WEB free system of FIG. 1.

The "PB operating information" is translated into the corresponding PB tone in, for example, an exchange of an element in the public line network 4B, and whereupon the center 3 receives the "PB operating information" in the form of PB tone. The PB operating information of the mobile telephone (Mobile Station: MS) 2 is, as shown in FIG. 4, input to a central controller (CC) 42a of an exchange 42 via a radio base station (BS) 41 as PB control signal. The PB control signal is translated into corresponding dial number information in the central controller 42a and then is input to a PB tone sending line (PBTS) 42b. As a result, PB tone corresponding to the PB pressed in the mobile telephone 2 is created in PB tone sending line 42b.

The PB tone is inserted (time division multiplexed) into voice data from the mobile telephone 2, which data is coded in a coder/decoder (CODEC) 42e of a sound processing equipment (SPE) 42d, by switching paths in a time division network (TDNW) 42c under the control of the central controller 42a. Finally, the PB tone is sent to the center 3 and is detected by the PB tone detecting/analyzing unit 35 in the center 3.

In data communication mode (e.g., browsing the Internet) of the mobile telephone 2, the data is communicated via a data communication channel 42g located below of a voice communication channel 42f in FIG. 4. At that time, the data is controlled by a data service control circuit (DSCC) 42i. The data of the data communication mode is coded in the exchange 42 (a coder-decoder (CODEC) 42h) unless the data has been coded on the mobile telephone 2 side.

An example of an operation performed in the WEB free system 1 having above-mentioned elements will now be described with reference to a series flow diagram of FIGS. 5 through 7 (Steps A1 through A41).

First of all, a user (customer) applies to a service provider for membership and completes a registration of personal data, which is required for the membership registration to receive services via user's mobile telephone 2, using a terminal, such as a personal computer (PC), protected by an encoding technique of SSL (Secure Socket Layer), or over the counter communication (Step A1).

After the completion of the membership registration, the user browses the Internet using the mobile telephone 2 to make an access to the contents server 32 in the center 3 via the Internet line 4A and selects "exchanging certification service contents" to be displayed on the LCD 6 (Steps A3, A4). Subsequently, in the illustrated example, it is assumed that the user inputs a "share code" (e.g., 4765) of a particular share and the user's ID (e.g., 5656) on the LCD 6 displaying the identical contents (Step A5) because the user desire to know the price of the particular share.

The information input by the user is send to the contents server 32 in the center 3 from the mobile telephone 2 via the Internet line 4A as input-by-user information regarding providing contents (Step A6). Upon receipt of the input-by-user information, the contents server 32 retrieves in a non-illustrated share price database with reference to the received "share code" and an entry code (e.g., 4216) peculiar to the input-by-user information is automatically created by the entry code creating section 32a (individual code creating step; Step A7).

The "entry code" is related with the "user ID" by the relating section 32c. As a result, the contents server 32 creates and manages the corresponding table 321 exemplified in FIG. 3(B). Alternatively, the "entry code" may consist of a simple combination of "user ID" and an identification code of "providing contents". However, in the illustrated example, the "entry code" of predetermined carries is automatically created since it is preferable that the "entry code" has several carries due to notification confirming by PB tone as described later.

In succession, the entry code sending section 32b in the contents server 32 attaches the created "entry code" and a telephone number of the center 3 to the result of retrieving the share price ("share price retrieving result contents") and sends the "share price retrieving result contents" to the mobile telephone 2 via the Internet line 4A (individual code sending step; Step A8).

It is prepared that each service designates a dedicated telephone number as the attached telephone number of the center 3 in the illustrated embodiment. A telephone number (044-123-4567) directs to the "share price query" in the form of a hyperlink is attached to the "share price retrieving result contents". At that time, the contents server 32 attaches a code (e.g., "186") to the fore part of the telephone number ("044-123-4567") of the center 3 for calling number notification setting so that the telephone number of the mobile phone 2 is notified the center 3 (the calling number notification setting of the mobile telephone 2 is carried out)-upon a phone-to operation with respect to the attached telephone number ("044-123-4567").

Figure 5:
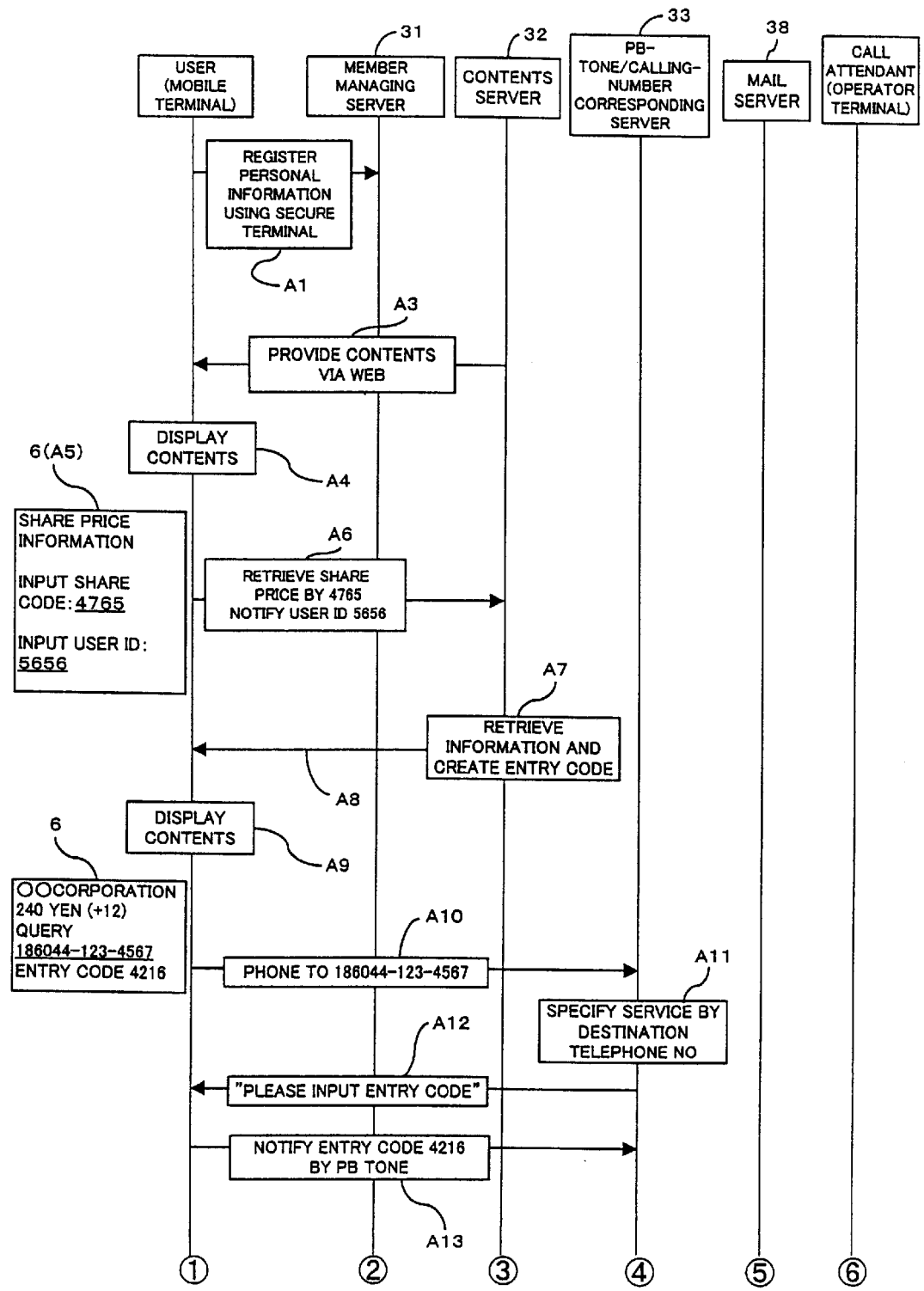
FIGS. 5 through 7 are flow diagrams showing a series of a procedure of providing service in the WEB free system of FIG. 1.

Meanwhile, the information is displayed on the LCD 6 of the mobile telephone 2 as schematically shown in FIG. 5 (Step A9). When the user wishes to make a query to the center 3 about the retrieved share price during the "share price retrieving result contents" is displayed, the user calls the center 3 by a phone-to operation with respect to the telephone number ("044-123-4567") directs to the "share price query" service displayed on the LCD 6 (Step A10). At that time, the telephone number of the mobile telephone 2 is also notified the center 3 by the calling number notification setting via the public line 4B.

The call from the user is received by the PB-tone/calling number corresponding server 33, which recognizes that the destination telephone number ("044-123-4567") of the call directs to the "share price query" service (Step A11) and performs an automatic voice answering to the mobile telephone 2 so as to request the user to input an "entry code" (Step A12).

When the user inputs the "entry code ("4216")" from the PBs of the keypad 12 in response to the request, this PB operation information is sent as the "entry code" by the entry code sending section 26c via the public line 4B and, finally, is notified the PB-tone/calling-number corresponding server 33 in the center 3 in the form of PB tone (individual code notifying step; Step A13).

After the phone-to (call-out) operation, the LCD 6 of the mobile telephone 2 is manually (e.g., by use of the display-changeover button 9) or automatically controlled to display the identical screen with that of before the operation. For example, after the state of calling-out due to the phone-to operation is displayed on the LCD 6 by temporarily flashing the destination telephone number, the screen of the LCD 6 may change over the "entry code" displaying screen by the display-changeover button 9, or may display the state of calling-out and the "entry code" displaying screen in combination.

The PB-button/calling-number corresponding server 33 notifies the contents server 32 of the "entry code ("4216"))" notified in the form of PB tone to retrieve input-by-user information (providing contents) corresponding to the "entry code ("4216")" (Step A14) since the call from the user directs to the "share price query" service. And the PB-button/calling-number corresponding server 33 also notifies the member managing server 31 of the calling number notification information from the mobile telephone 2 (Step A15).

Upon receipt of the "entry code ("4216")" from the PB-tone/calling-number corresponding server 33, the specifying section 32d in the contents server 32 retrieves in the corresponding table 321 (FIG. 3(B)) using the "entry code ("4216")" as a key and thereby obtains (specifies) a "user ID" corresponding the "entry code". The specifying section 32d notifies the member managing server 31 of the "user ID" (Step A16) and specifies the contents input by the user ("share price retrieving contents" in the illustrated example) (specifying step; Step A17).

In the meantime, the verifying section 31a in the member managing server 31 specifies the user of the mobile telephone 2 by retrieving in the member registration database 311 (FIG. 3 (A)) using the calling number notification information of the mobile telephone 2, which has been received from the PB-tone/calling-number corresponding server 33, and the "user ID", which has been received from the contents server 32, as keys. The retrieved personal data of the user is drawn from the member registration database 311 and provided to the contents server 32 (Step A18).

The contents server 32 provides the operator terminal 37-i via the CTI server 34 with the contents ("share price retrieving contents"), which has been specified by the above-mentioned manner, or information (e.g., documents prepared for an exposition of share price) with respect to the specified contents, and the personal data, which has been provided from the member managing server 31 (Step A19).

As a result, an operator (call attendant) in the center 3 provides the user (customer) with voice communication service (e.g., future growth forecast of share price of which the user is making a query) looking through the information, which has been provided from the contents server 32, displayed on the operator terminal 37-i (service providing step; Step A20).

In the system 1 of the illustrated embodiment, an "entry code" peculiar to each WEB (contents) to which a user has input information is created, and, upon voice communication with the user, input-by-user contents is retrieved with reference to the "entry code", which is received from the public line 4B in the form of PB tone, to be specified. Finally, the center 3 provides the user with voice communication service based on the input-by-user contents.

It is possible to connect voice communication service with WEB service by sending the input-by-user contents to which the user has input information and the "entry code", as the minimum two kinds of information necessary for service which the user is receiving, to the center 3 from the mobile telephone 2 via two different communication lines 4A, 4B, respectively. Such information providing manner is substantially identical with those of later-described second and third embodiments.

Therefore, it is possible to provide smooth and careful voice communication over the telephone corresponding to a demand of the user on WEB. Particularly in the illustrated embodiment, partly since the user of the mobile telephone 2 is specified due to the user information specifying process by use of the "calling number notification information", partly since personal data of the user is also provided to the operator in addition to input-by-user (providing) contents and the "entry code, it is further possible to provide the user with higher-quality service.

After the user hangs up the voice communication (disconnection of the voice communication line), it is assumed that the user wishes to purchase the share of which the user has made a query, redisplays the "exchanging share service contents" to look through on the LCD 6 of the mobile telephone 2 (Step A21), and make a "purchase share" operation on the current screen. An execution of the "purchase share" operation is received by the contents server 32 in the center 3 via the Internet line 4A as a "purchasing share" request. And the contents server 32 provides the mobile telephone 2 with "purchasing share contents" responsive to the "purchasing share" request (Step A23).

The user looks at the "purchasing share contents" on the LCD 6 of the mobile telephone 2 (Step A24), and inputs a "share code" of the share to be purchased and the "user ID ("5656")" (Step A25). The "share code" and the "user ID" are send to the contents server 32 via the Internet line 4A (Step A26). The contents server 32 retrieves and specifies the share corresponding to the "share code" and automatically creates another "entry code ("4220")" peculiar to the input-by-user information ("purchasing share contents) (Step A 27).

The "entry code ("4220")" is also related with the "user ID ("5656")" together with the input-by-user information ("purchasing share contents") (FIG. 3 (B)).

In succession, the entry code sending section 32b in the contents server 32 attaches the created "entry code" and a telephone number ("044-123-5678") of the center 3 to the result of retrieving the share ("purchasing share contents") and sends the "purchasing share contents" to the mobile telephone 2 via the Internet line 4A (Step A28).

The telephone number (044-123-5678) of the center 3 directs to the "purchasing share" service and is attached to the "purchasing share contents" in the form of a hyperlink or the like. Also at that time, the contents server 32 attaches a code (e.g., "186") to the fore part of the telephone number ("044-123-5678") of the center 3 for calling number notification setting so that the telephone number of the mobile phone 2 is notified the center 3 (the calling number notification setting of the mobile telephone 2 is carried out) upon an execution of a phone-to operation with respect to the attached telephone number ("044-123-5678").

Figure 6:
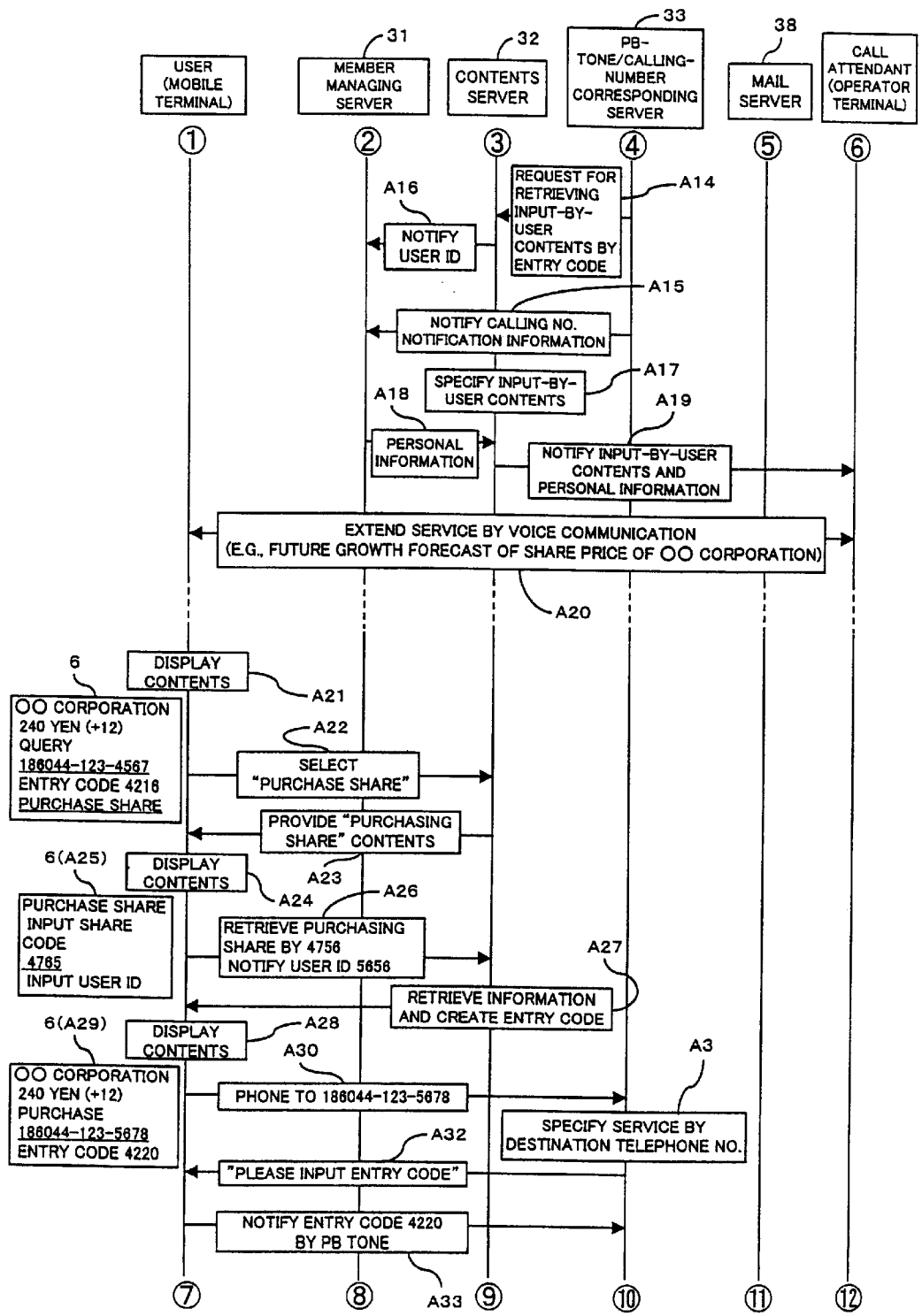
Figure 7:
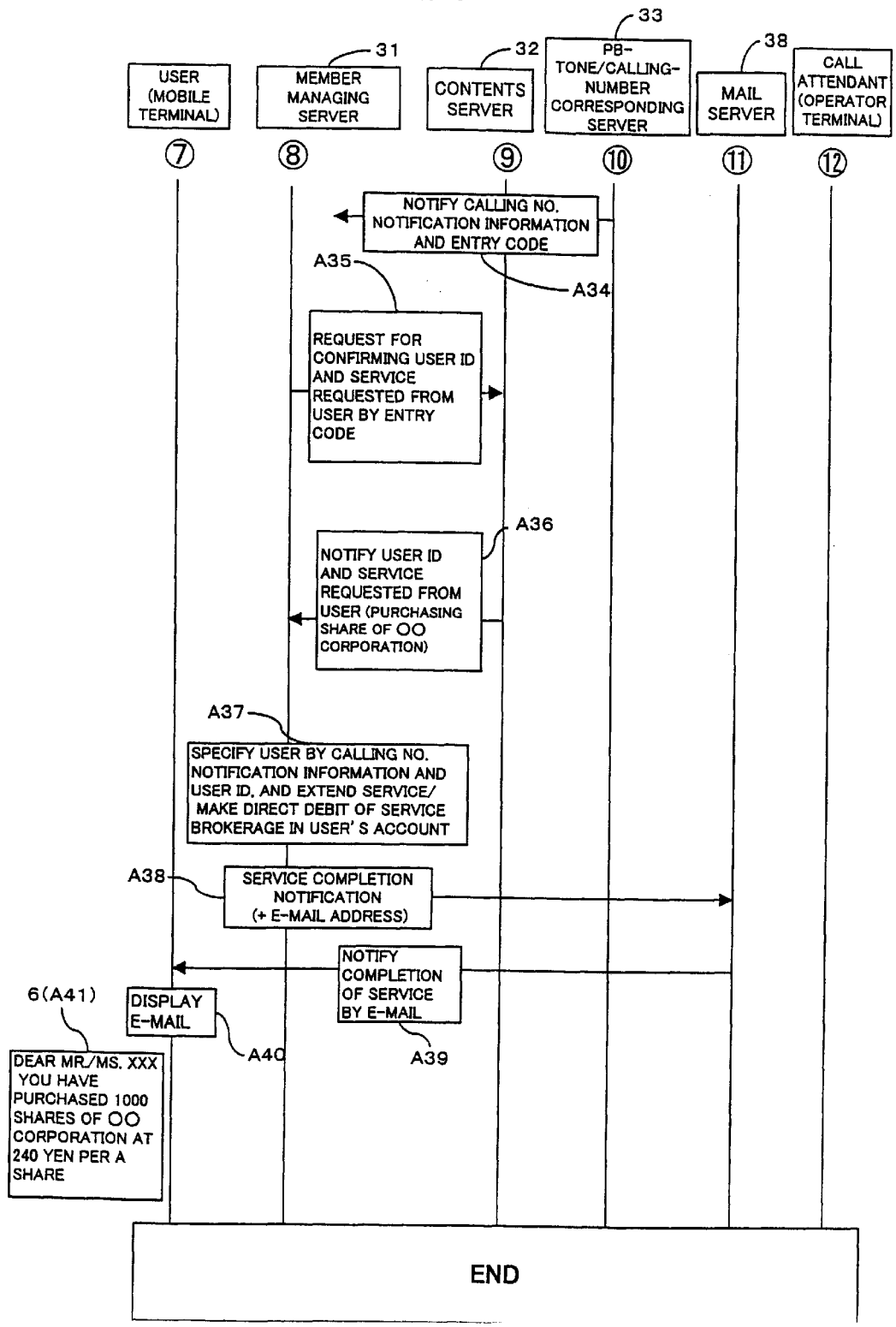

Meanwhile, the information is displayed in the LCD 6 of the mobile telephone 2 as schematically shown in FIG. 6 (Step A29). When the user wishes to purchase the share, the user calls the center 3 by a phone-to operation with respect to the telephone number ("044-123-5678") directs to the "purchasing share" service displayed on the LCD 6. At that time, the telephone number of the mobile telephone 2 is also notified the center 3 by the calling number notification setting via public line 4B (Step A30).

The call from the user is received by the PB-tone/calling-number corresponding server 33, which recognizes that the destination telephone number ("044-123-5678") of the call directs to the "purchasing share" service (Step A31) and performs an automatic voice answering to the mobile telephone 2 so as to request the user to input the "entry code" (Step A32).

When the user inputs the "entry code ("4220")" in response to the request, the "entry code ("4220")" is notified the PB-tone/calling-number corresponding server 33 in the form of PB tone (Step A33). The PB-tone/calling-number corresponding server 33, as shown in FIG. 7, notifies the member managing server 31 of the "entry code ("4220")" notified in the form of PB tone and the calling number notification information from the mobile telephone 2 (Step A34) since the call from the user directs to the "purchasing share" service.

Upon receipt of the "entry code ("4220")" and the calling number notification information, the member managing server 31 requests a verification of the "user ID" and the service (providing contents) requested from the user by notifying the contents server 32 of the "entry code ("4220")" (Step A35). Upon receipt of the request, the contents server 32 authenticates the "user ID" and the "providing contents" corresponding to the "entry code ("4220")" with reference to the corresponding table 321 of FIG. 3(B), and notifies the member managing server 31 of the result of the authentication (Step A36).

The member managing server 31 specifies the personal data of the user by retrieving in the member registration database 311 (authentication step) based on the "calling number notification information", which has been send the center 3 via the public line 4B and which has been notified by the PB-tone/calling-number corresponding server 33, and the "user ID", which has been send the center 3 via the Internet line 4A and has been notified by the contents server 32. Subsequently, the member managing server 31 extends "purchasing share" service and then makes a direct debit (settlement) of the price (service brokerage) regarding the "purchasing share" in the above-mentioned user's account (service providing step; Step A37).

Namely, the member managing server 31 of the illustrated embodiment also functions as a settlement agent's terminal (an apparatus for providing settlement service), which providing settlement service regarding the price of "share" as a commodity by receiving the result of the authentication.

Upon completion of the settlement service, the member managing server 31 notifies the mail server 38 of the e-mail address of the user, which has been received a series of the service, with reference to the member registration database 311 (Step A38). The mail server 38 creates an e-mail notifying the user of the completion of the series of the service and whereupon sends it to the mobile telephone 2 (Step A39). With such notification, it is possible for the user of the mobile telephone 2 to surely confirm the valid completion of the "purchasing share" (Steps A40, A41). Alternatively, the notification may, of course, be send by the mails.

Since personal data of the user is verified based on both (combination of) the "user ID" and the "calling number notification information" of the mobile telephone 2 in the system 1 of the illustrated embodiment, it is possible to perform an exact verification of the user even if the telephone number of the mobile telephone 2 is reused. As a result, settlement of the price regarding the service received by the user using the mobile telephone 2 can be made secury.

Particularly, since the "calling number notification information", which is a part of information required for the verification of a user, is notified via the public line 4B, which is separated from the Internet line 4A in the illustrated embodiment, it is possible to drastically reduce the possibility of the information being stolen and being decoded as compared with via only the Internet line 4A, where any unnamed user can access all the information.

Namely, at least two kind of information of the "user ID" and the "calling number notification information" are sent to the center 3 respectively via the Internet line 4A and the public line 4B, which are different from each other. Therefore, it is possible to perform a highly secure verification of a user of the mobile telephone 2 without using a special encryption technique, such as SSL. The later-described second and third embodiments have this advantageous feature of a secure verification.

In the illustrated embodiment, the "input-by-user information" and the "entry code" obtained at the Step A7 in FIG. 5 (or at the Step A27 in FIG. 6) are provided the mobile telephone 2 in the form of WEB data. Alternatively, if the mail server 38 responds to WEB data (HTML data), the contents server 32 may provide the mail server 38 with the "input-by-user information" and the "entry code" in the form of WEB data, and whereupon an e-mail having identical contents may be displayed on the mobile telephone 2.

Specifically, the contents sever 32 provides the mail server 38 with the "user ID" and the "entry code" obtained at the Step A7. Then the mail server 38 creates an e-mail to which the "user ID" and the "entry code" from the contents server 32 and the telephone number of the center 3 are attached, and sends the e-mail to the mobile telephone 2. The following operations of this case are identical with above-described operation with reference to FIGS. 5 through 7.

The mail server 38 may be notified of the "user ID" corresponding to the e-mail address of the mobile telephone 2 by the contents server 32 and then refers to the member managing server 31 to obtain the e-mail address. Alternatively, the contents server 32 may notify the member managing server 31 of the "user ID", and the member managing server 31 may notifies the mail server 38 of the e-mail address of the mobile telephone 2 corresponding to the "user ID". In either case, the "user ID" have to univocally define the user.

When the e-mail address has not previously registered, or the user wishes to send an e-mail to a destination of another e-mail address which has not registered, the user newly inputs the e-mail address of desired destination on the WEB.

(B) Second Embodiment

Figure 8:
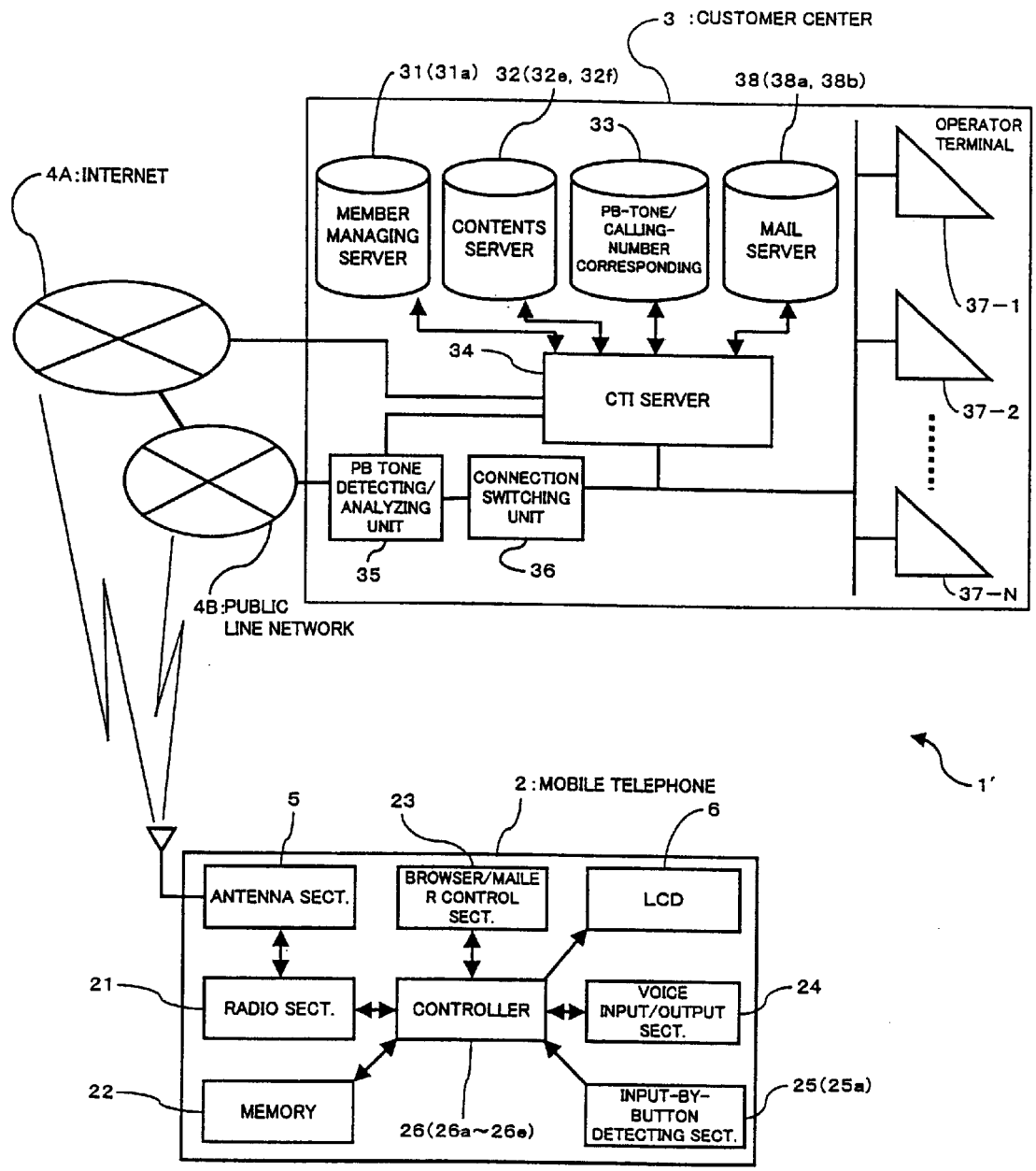
FIG. 8 is a block diagram schematically showing a WEB free system according to a second embodiment of the present invention.

FIG. 8 is a block diagram schematically showing a WEB free system 1' according to a second embodiment. The WEB free system 1' (hereinafter also called "system 1'") of FIG. 8 is further equipped with an entry code creating section 32e and a relating section 32f, which are in the contents server 32, and an entry code sending section 38a and a providing contents specifying section 38b, which are in the mail server 38, as different points from the system 1 of the first embodiment.

The entry code creating section 32e in the contents server 32 creates an "entry code" dedicated to and peculiar to individual contents provided for the mail server 38 (hereinafter also called "providing contents") for sending the providing contents to the mobile telephone 2 by an e-mail. The "entry code" is identical with that of the first embodiment and is notified the mail server 38 in the illustrated embodiment.

The relating section 32f manages the corresponding table 321 exemplified by the FIG. 3(B) by relating the "entry code" created in the entry code creating section 32e with the "user ID", which is notified from the member managing server 31, and the "providing contents", as the first embodiment.

The entry code sending section 38a of the mail server 38 sends the mobile telephone 2 the "entry code", which is created and notified by the entry code creating section 32e, via the Internet line 4A by attaching the "entry code" to the "providing contents" in an e-mail to be sent to the mobile telephone 2 in the form of a hyperlink.

The providing contents (information) specifying section 38b specifies "providing contents" to be sent to the mobile telephone 2 based on the "entry code", which is received from the mobile telephone 2 in the form of PB tone via the public line 4B.

The "entry code" of the system 1 of the first embodiment is created by individual "input-by-user contents" on the WEB. On the other hand, when the system 1' of the illustrated embodiment provides contents corresponding to the service by sending an e-mail (contents mail) independently created in the center 3 (the mail server 38), the "providing contents" for the mobile telephone 2 is specified by creating the "entry code" dedicated to individual "providing contents (providing information)" irrespective of the "input-by-user information".

With such elements in the system 1', the entry code receiving section 26b in the mobile telephone 2 receives the "entry code", which is attached to an e-mail and is sent via the Internet line 4A, and after the call-out process to the center 3, the entry code notifying section 26c sends the "entry code" which has been received in the entry code receiving section 26b, as information for specifying the "providing contents" in the center 3, via the public line 4B. The other parts or elements designated same reference numbers operate identically between the first and the second embodiments.

An example of an operation performed in the WEB free system 1' having above-mentioned elements will now be described with reference to a series of a flow diagram of FIGS. 9 and 10.

First of all, a user (customer) applies to a service provider for membership and completes a registration of personal data, which is required for the membership registration to receive services via user's mobile telephone 2, using a terminal, such as a personal computer (PC), protected by an encoding technique of SSL, or over the counter communication (Step B1).

After the completion of the membership registration, the member managing server 31 notifies the contents server 32 of the "user ID" and the "e-mail address" of the user (the mobile telephone 2) who is going to receive an e-mail based on information in the member registration database 311 (Step B2).

Then the contents server 32 provides the mail server 38 with contents (e.g., the "retrieving share price" contents in the first embodiment) to be sent to (provided for) the user (Step B3), and the entry code creating section 32e creates an "entry code" (e.g., "4216") peculiar to the "providing contents" and to notify the mail server 38 of it (Step B4). The "entry code" is related with the "user ID" by the relating section 38f as the first embodiment.

The mail server 38 (the entry code sending section 38a) creates an e-mail in which the "entry code ("4216")" and the telephone number (e.g., "044-123-4567") of the center 3 in the form of a hyperlink are attached to the "providing contents", which is received from the contents server 32 and retains the e-mail (Step B6). The mail server 38 receives an e-mail address of the destination of the created e-mail from the contents server (Step B5), and sends the e-mail to the destination address (sending step).

The telephone number (044-123-4567) directs to the "share price query" service also in the illustrated embodiment. At that time, the mail server 38 attaches a code (e.g., "186") to the fore part of the telephone number ("044-123-4567") of the center 3 for calling number notification setting so that the telephone number of the mobile phone 2 is notified the center 3 (the calling number notification setting of the mobile telephone 2 is carried out) upon a phone-to operation with respect to the attached telephone number ("044-123-4567").

Figure 9:
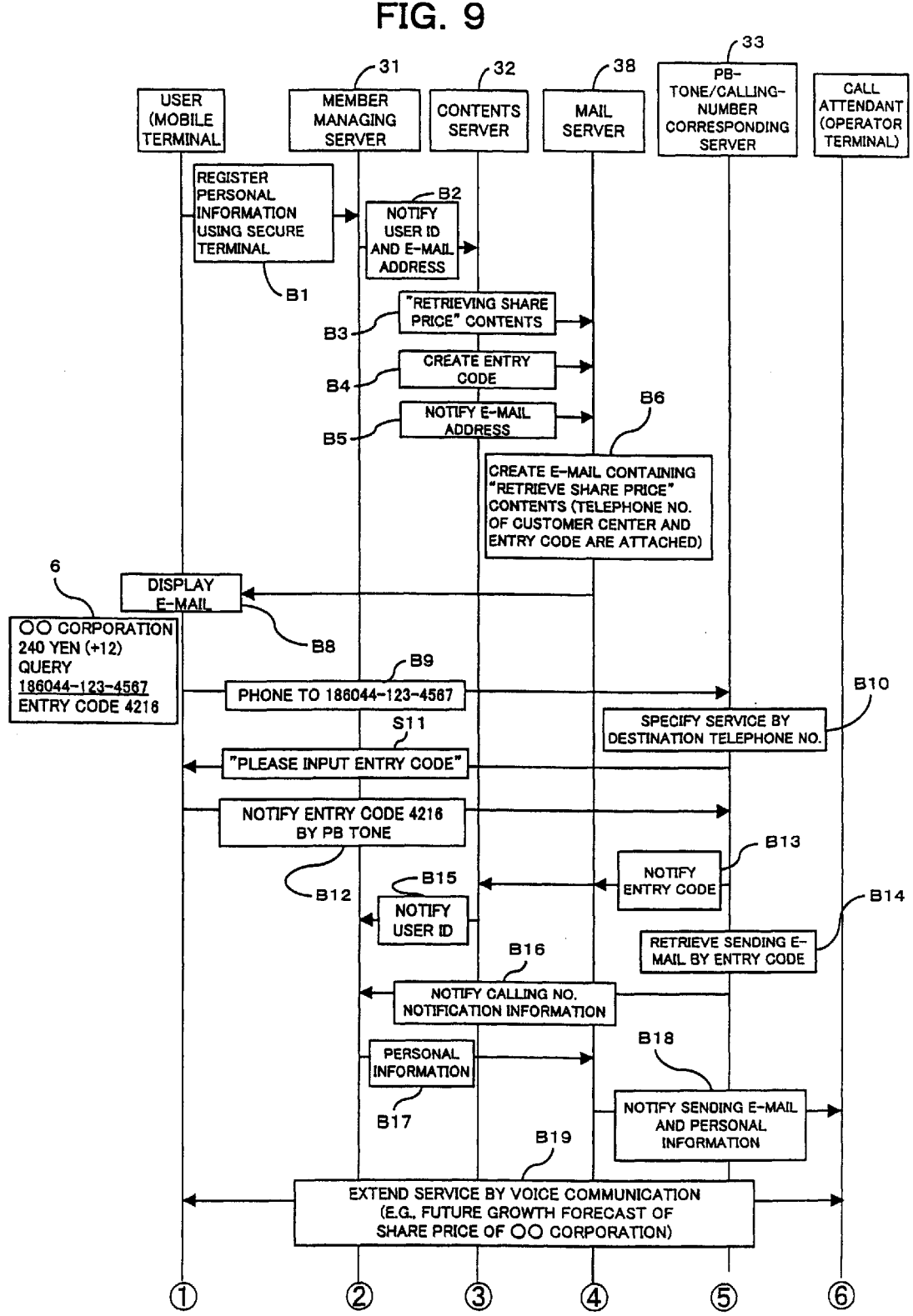
FIGS. 9 and 10 are flow diagrams showing a series of a procedure of providing service in the WEB free system of FIG. 8.

When the user accesses to the center 3 (the mail server 38) via the mobile telephone 2 to check the user's account, the mobile telephone 2 receives the e-mail via the Internet line 4A and displays the e-mail on the LCD 6 as shown in FIG. 9 (Step B8).

When the user wishes to make a query to the center 3 about the contents mail (share price) during the e-mail is displayed on the LCD 6, the user calls the center 3 by a phone-to operation with respect to the telephone number ("044-123-4567") directing to the "share price query" service on the LCD 6 (Step B9). At that time, the telephone number of the mobile telephone 2 is also notified the center 3 by the calling number notification setting via the public line 4B.

The call from the user is received by the PB-tone/calling number corresponding server 33, which recognizes that the destination telephone number ("044-123-4567") of the call directs to the "share price query" service (Step B10) and performs an automatic voice answering to the mobile telephone 2 so as to request the user to input the "entry code" (Step B11).

When the user inputs the "entry code ("4216")" from the PBs of the keypad 12 in response to the request, this PB operating information is sent as the "entry code" by the entry code sending section 26c via the public line 4B and is finally notified the PB-tone/calling-number corresponding server 33 in the center 3 in the form of PB tone (individual code notifying step; Step B12).

After the phone-to (call-out) operation, the LCD 6 of the mobile telephone 2 is manually (e.g., by use of the display-changeover button 9) or automatically controlled to display the identical screen with that of before the operation also in the illustrated embodiment. For example, after the state of calling-out resulted from the phone-to operation is displayed on the LCD 6 by temporarily flashing the destination telephone number, the screen of the LCD 6 may change over the "entry code" displaying screen by the display-changeover button 9, or may display the state of calling-out and the "entry code" displaying screen in combination.

The PB-button/calling-number corresponding server 33 notifies the contents server 32 and the mail server 38 of the "entry code ("4216")" notified in the form of PB tone (Step B13) since the call from the user directs to the "share price query" service. Subsequently, the providing contents specifying section 38b of the mail sever 38 retrieves and specifies "providing contents" corresponding to the "entry code ("4216")" (providing information specifying step; Step B14), and the contents server 32 specifies the "user ID" based on the "entry code" to notify the member managing server 31 of the "user ID" (Step B15).

Meanwhile, the PB-tone/calling-number corresponding server 33 notifies the member managing server 31 of calling number notification information from the mobile telephone 2 (Step B16). Upon receipt of the information, the verifying section 31a of the member managing server 31 specifies personal data of the user of the mobile telephone 2 by retrieving in the member registration database 311 (FIG. 3(A)) using the calling number notification information, which has been notified from the PB-tone/calling-number corresponding server 33, and the user ID, which has been notified from the contents server 32, as keys, and then draws the retrieved personal data of the user to provide for the mail server 38 (Step B17).

The mail server 38 provides the operator terminal 37-*i* as the call-out destination of the mobile telephone 2, via the CTI server 34, with the providing contents ("share price retrieving contents"), which has been specified by the above-mentioned manner, or information (e.g., documents prepared for an exposition of share price) about the providing contents, together with the personal data, which has been provided from the member managing server 31 (Step B18).

As a result, an operator (call attendant) in the center 3 provides the user (customer) with voice communication service (e.g., future growth forecast of share price of which the user is making a query) looking at the information, which has been provided from the contents server 32, displayed on the operator terminal 37-*i* (service providing step; Step B19) same as the first embodiment.

It is assumed that the user wishes to purchase the share of which the user has made a query and, for example, requests the center 3 to send an e-mail having "purchasing share" contents during the voice communication with the operator of the center 3. After a disconnection of the voice communication, responsive to the request, the member managing server 31, as shown in FIG. 10, notifies the contents server 32 of the "user ID" and the "e-mail address" of the user (the mobile telephone 2), which is going to receive the e-mail based on information in the member registering database (Step B20).

The contents server 32 provides the mail server 38 with the providing contents ("purchasing share" contents) to be sent to the user (Step B21) in the same manner as sending an e-mail having the "retrieving share price" contents, and makes the entry code creating section 32e create another "entry code (e.g., "4220")" peculiar to the providing contents and notify the mail server 38 of the "entry code" (Step B22). The "entry code ("4220")" is also related with the "user ID" by the relating section 32f.

The mail server 38 (the entry code sending section 38a) creates and retains an e-mail (Step B24) having the "providing contents, to which the "entry code ("4220")" and the telephone number (e.g., "044-123-5678") in the form of a hyperlink are attached, and the "providing contents" has been received from the contents server 32. The mail server 38 receives an e-mail address of the destination of the created e-mail from the contents server 32 (Step B23), and sends the e-mail to the destination address.

At that time, the mail server 38 attaches a code ("186") to the fore part of the telephone number ("044-123-5678") of the center 3 for calling number notification setting so that the telephone number of the mobile phone 2 is automatically notified to the center 3 (the calling number notification setting of the mobile telephone 2 is carried out) upon a phone-to operation with respect to the attached telephone number ("044-123-5678").

Figure 10:
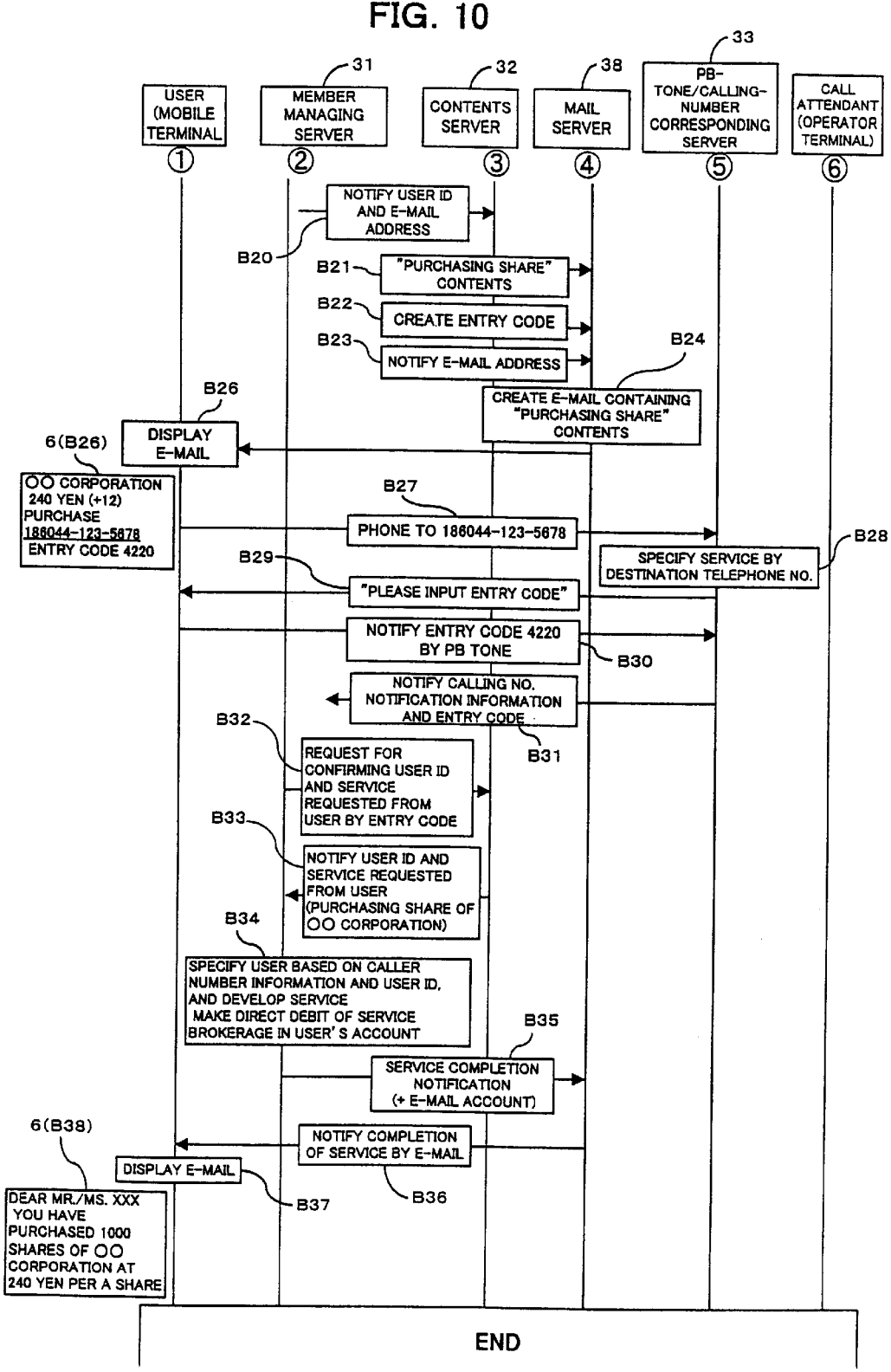

When the user accesses to the center 3 (the mail server 38) using the mobile telephone 2 to check the user's account, the e-mail is received and is displayed on the LCD 6 of the mobile telephone 2 as shown in FIG. 10 (Steps B25 and B26). For example, when the user wishes to make a purchase of share while the e-mail is displayed on the LCD 6, the user calls the center 3 by a phone-to operation with respect to the telephone number ("044-123-5678") directing to the "purchasing share" service displayed on the LCD 6. At that time, the telephone number of the mobile telephone 2 is also notified to the center 3 by the calling number notification setting via the public line 4B (Step B27).

In succession, the system 1' performs receiving/sending the "entry code", a verification of the user based on the "user ID" and the "calling number notification information", making direct debit of price regarding an execution of service in the user's bank account, and a notification of completion of "purchasing share" service (Steps B28 through B38) in the same manner as the Steps A31 through A41 in the first embodiment.

In the second embodiment, the individual "entry code" dedicated to individual providing contents sent to the user via e-mail is created, and the "providing contents" is retrieved and specified with reference the "entry code" received in the form of the PB tone via the public line 4B during voice communication with the user, and the voice communication service for the user is thereby executed. Since service is provided for the user based on the specified "providing contents" (namely, it is possible to connect voice-communicating service with WEB service and e-mail service), it is possible to provide the user with smooth responses (voice communication).

Partly since personal data of the user of the mobile telephone 2 is specified by the verification using the "calling number notification information" of the mobile telephone 2, partly since the personal data of the user can be also provided the operator, it is possible for the operator to provide the user with higher-quality responses in the illustrated embodiment. Further, since the verification of the personal data of the user is performed based on both (combination of) the "user ID" and the "calling number notification information" of the mobile telephone 2 in the system 1' of the illustrated embodiment, it is possible to perform exact verification of a user even if the telephone number of the mobile telephone 2 is reused. As a result, settlement of the price regarding the service received using the mobile telephone 2 can be made in secure.

Particularly, since the "calling number notification information", which is a part of information required for the verification of a user, is notified via the public line 4A, which is separated from the Internet line 4A, in the illustrated embodiment, it is possible to drastically reduce the possibility in being stolen and being decoded the information as compared with via the Internet line 4A, where any unnamed user can access all the information. As a result, it is possible to perform highly secure verification of a user of the mobile telephone 2 without using a special encryption technique, such as SSL.

In the illustrated embodiment, the mail server 38 creates an e-mail having contents provided the individual user (the mobile telephone 2) and sends the e-mail to the user. Alternatively, the contents server 32 may create WEB data having the identical contents with the e-mail and may provide the mobile telephone 2 in the form of the WEB data on the WEB as the first embodiment.

(C) Others

In the first and second embodiments, both contents on which the user inputs information (or contents independently provided by the center 3 by an e-mail or on the WEB) and personal data of the user are provided the operator upon voice communication with the user. Alternatively, the operator may be provided with only the contents; since the user (individual person) of the mobile telephone 2 does not have to be identified in this case, the verification of the user using the "calling number notification information" does not have to be performed.

Since it is required exact verification of the user upon settlement (e.g., making a direct debit of the price regarding service), the verification of the user has to be carried out using the "calling number notification information" as described above. Conversely, the verification of the user using the "calling number notification information" is not always necessary for verification of the user to draw the personal data upon voice communication between the user and the operator. For example, if the "user ID" is not defined by the user but the service provider allocates it, the service provider specifies the personal data of the user based on only the "user ID" to draw personal data of the user.

The user inputs the "entry code" by every single number from the PBs 12 of the mobile telephone 2 in the first and second embodiments. Alternatively, the "entry code" may be automatically input and send by pressing a predetermined one-touch button after the phone-to operation; the "entry code" may be automatically sent without a manual operation after the phone-to operation; the "entry code" may be automatically sent at the same time when the phone-to operation to the center 3 is executed by adding (attaching) the "entry code" following to the telephone number of the center 3 in the form of a hyperlink or other means.

The "purchasing share" service is executed after the operations regarding the "retrieving share price" service (completion of the voice communication service provided for the user by the operator) in the first and second embodiments. Alternatively, theses services are, of course, performed independently.

Further, these services may be performed by an appropriate combination, such as the "retrieving share price" service in the first embodiment and the purchasing share" service in the second embodiment.

Still further, the call-out operation to the center 3 from the mobile telephone 2 does not always have to be performed by a phone-to operation, but may be by an ordinary call-out operation of inputting by every single number.

The member managing server 31, the contents server 32, the PB-tone/calling-number corresponding server 33, the CTI server 34, and the mail server 38 of the systems 1, 1' are disposed in one place (i.e., the center 3). Alternatively, these elements may be disposed in respective different places or may be decentralized within a network.

The manner of the "verification of the user" can be used not only in "online trading" but also any service necessitates exact "verification of the user" on a mobile telephone. For example, the "verification of the user" manner can be used when a user connects a mobile terminal, such as a notebook type PC or a PDA (personal digital assistance) with a mobile telephone and makes a remote-access to (logs in) a certain network (e.g., in-company LAN (local area network)).

At that time, since the mobile terminal, to which the mobile telephone is connected, do not have to be installed dedicated software or an encryption technique for the "verification of the user", it is possible to reduce the capacity in CPU or memory in the mobile terminal.

Further, it is possible to use the "verification of the user" for settlement regarding purchasing of a commodity. Namely, it is possible to buy a commodity using the mobile telephone 2 as a substitution for a purse or a credit card. Such example will now be described in a following third embodiment.

(D) Third Embodiment

Figure 11:
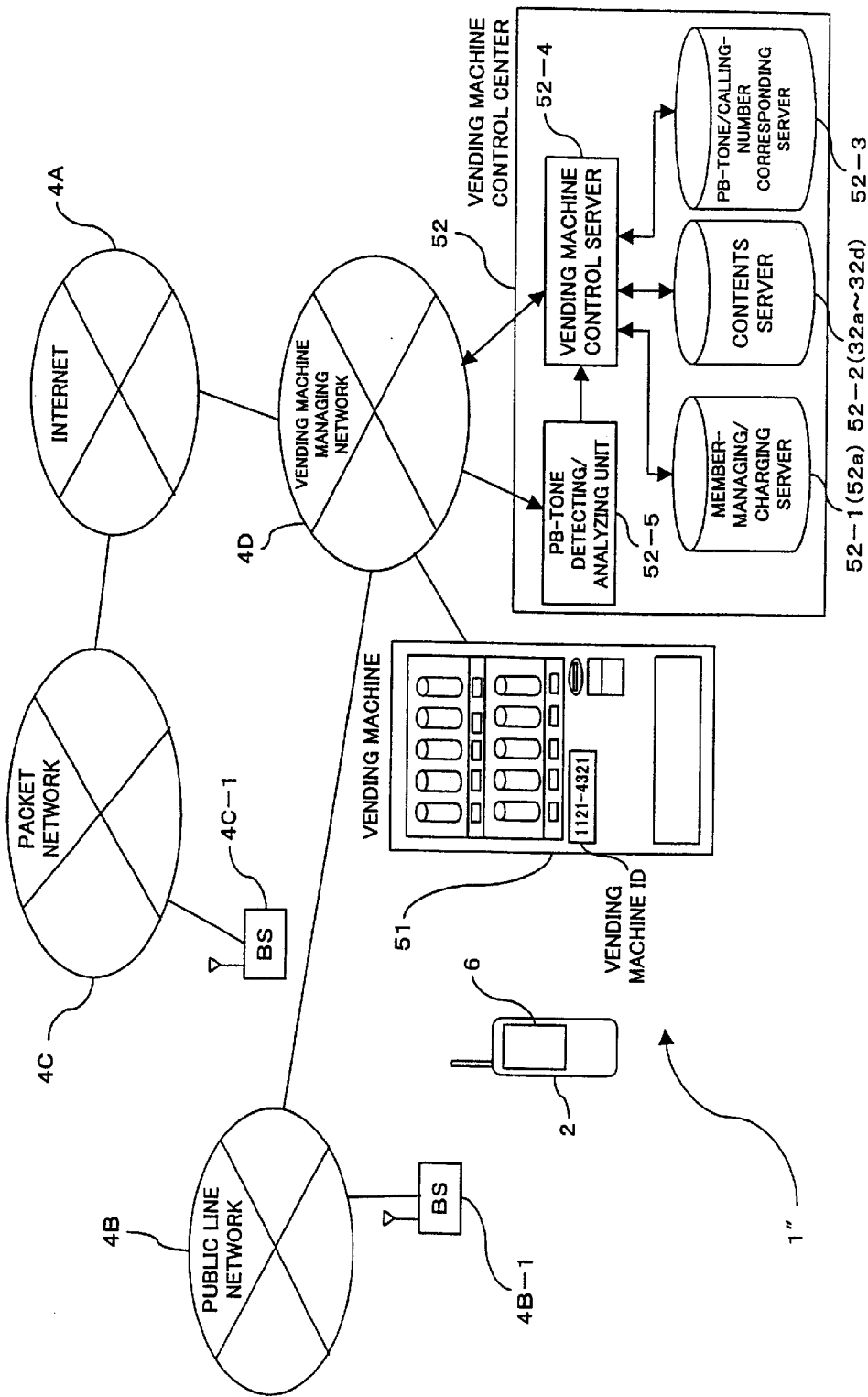
FIG. 11 is a block diagram schematically showing a WEB free system according to a third embodiment of the present invention.

FIG. 11 is a block diagram schematically showing a WEB free system 1" according to a third embodiment. The Web free system 1" comprises a mobile telephone 2, a vending machine (a commodity selling machine) 51, Internet 4A, a public line 4B, a packet network 4C, a vending machine managing network 4D, and a vending machine control center 52. A mobile telephone 2 and a vending machine 51 appear in FIG. 11 for convenience, however a numbers of these elements, of course, exist in the system 1".

The mobile telephone 2 makes an access to the vending machine control center 52 from the radio base station (BS) 4C-1 of the packet network 4C through the packet network 4C, the Internet 4A, and the vending machine managing network 4D. The mobile telephone 2 also makes an access to the vending machine control center 52 from the radio base station (BS) 4B-1 of the public line network 4B through the public line 4B and the vending machine managing network 4D.

Also throughout the illustrated third embodiment, the term "Internet line" means a line (data communication lines) which performs data communication via the Internet 4A, to which unspecified users (third parties) can access. Conversely, the term "public line" means a line (a voice or/and data communication line) which performs communication via the public line 4B by a point-to-point connection and, differently from the Internet 4A, do not allow to be accessed by any unspecified user (third party).

The mobile telephone 2 is identical in hardware construction with those of the first and the second embodiments (FIGS. 1, 2 and 8). Therefore, parts or elements designated same reference numbers operate and function same as the mobile telephone 2 of the above-mentioned embodiments.

The vending machine 51 sells a commodity without a clerk by being inserted into a predetermined price for the commodity. The commodities to be sold therein are, as in common practice, beverages (e.g., juice, beer), cigarettes, books, snacks, music/image software, and games. The vending machine is also various ticket dispensers for selling a ticket for transportation in traffic, parking in a parking lot, and meal in restaurant.

Therefore, a transportation ticket, a parking ticket, and a meal ticket are included in the "commodity" sold by the vending machine 51. The vending machine 51 is connected with the vending machine managing network 4D by wire or air so as to communicate with the vending machine control center 52 for inventory control or the like irrespective of kind of the "commodity".

The vending machine control center (settlement agent apparatus) 52 provides a user of the mobile telephone 2 with WEB service through which the user buys a commodity from the vending machine 51 using the mobile telephone 2. For example, if it is certified that the user of the mobile telephone 2 is an authorized member for "WEB vending machine service", which is provided by the vending machine control center 52, and that the user is capable of paying the price for the commodity (settlement) (namely, the user is an authorized receiver for the service), the vending machine control center 52 makes settlement for the price of the commodity, takes the commodity out of the vending machine 51, or makes the vending machine 51 a state that money is inserted by an online remote control. With such operations performed by the vending machine control center 52, the user can buy a commodity using the mobile telephone 2 without inserting money in the vending machine 51.

The "online" remote control for the vending machine 51 may be performed via the packet network 4C or the public line network 4B. The operation has to be performed via a dedicated communication line to which a public user cannot make an access, in either case.

The vending machine control center 52, which executes such services for the user, comprises a member-managing/charging server 52-1, a contents server 52-2, a PB-tone/calling-number corresponding server 52-3, a vending machine control server 52-4 and a PB tone detecting/analyzing unit 52-5, as shown in FIG. 11.

The member-managing/charging server 52-1 is identical with the member managing server 31 in the first and the second embodiments. The member-managing/charging server 52-1 of the illustrated embodiment manages the personal data of the user, who receives the "WEB vending machine service" as the WEB service using the mobile telephone 2, as member (user) registration information, certifies the user as an authorized user, and makes settlement (charges) of the price for the commodity bought from the vending machine 51 by the user using the mobile telephone 2.

The personal data is the telephone number of the mobile telephone 2, user identification (ID) (user identification information), the number of bank account, in which a direct debit of the price for the commodity bought from the vending machine 51 is made, and an e-mail address. The member-managing/charging server 52-1, as shown in FIG. 3(A), retains and manages the various personal data per an individual person in the form of a table as a member registration database (user registration information managing section) 311. The "user ID" may be defined independently by the user or may be assigned on a service provider (the vending machine control center 52) side.

The member-managing/charging server (verification unit) 52-1 also functions as a verification section 52a for performing an verification process to specify personal data of a user and verify the use of the "WEB vending machine" service via the mobile telephone 2. The verification process is performed by collating the user ID, which is received via the Internet communication line 4A, and the telephone number (calling number notification information; terminal identification information (terminal ID)) peculiar to the mobile telephone 2, which is notified via the public line 4B, with the member registration information previously registered in the member registration database 311.

The contents server 52-2 manages various contents (WEB data) for the "WEB vending machine service". The various contents are exemplified by contents for inputting an ID assigned to each vending machine 52 (hereinafter also called "a vending machine ID), contents for inputting a user ID, and contents for displaying a menu of commodities sold in the vending machine, which is identified based on the vending machine ID.

The contents server 52-2 further functions as an entry code creating section 32a for creating an "entry code" in accordance with contents provided for the mobile telephone 2, an entry code sending section 32b for sending the "entry code" created by the entry code creating section 32a to the mobile telephone 2 via the Internet line 4A, and a relating section 32c for relating the "entry code" with the "WEB vending machine service" contents, also in the illustrated embodiment.

The PB-tone/calling-number corresponding server 52-3 is identical with the PB-tone/calling-number corresponding server 33 in the above-mentioned embodiment. The PB-tone/calling-number corresponding server 52-3 notifies the member-managing/charging server 52-1 of PB operating information, which is detected and analyzed as the "entry code" by the PB tone detecting/analyzing unit 52-5, or call-out information (calling number notification information) of the mobile telephone 2 in accordance with destination telephone number information. The PB operating information has been received in PB tone from the mobile telephone 2 via the public line 4B.

The vending machine control server (service providing unit) 52-4 provides the user with service by operating in connection with the member-managing charging server 52-1, the contents server 52-2, the PB-tone/calling-number corresponding server 52-3. The providing service are taking a commodity out of the vending machine 51 in which the user verified the use of the "WEB vending machine service" is going to buy a commodity or are making the vending machine 51 a state that money is inserted by controlling the vending machine 51 via the vending machine managing network 4D.

Namely, the vending machine 51 of the illustrated embodiment functions as a commodity selling machine (service providing unit), which provides the user with service of selling a commodity, responsive to the received result of the verification in the member-managing/charging server 52-1.

The PB tone detecting/analyzing unit 52-5 is identical with the PB tone detecting/analyzing unit 35, and obtains PB operating information of the mobile telephone 2 by detecting and analyzing PB tone received via public line 4B.

Figure 12:
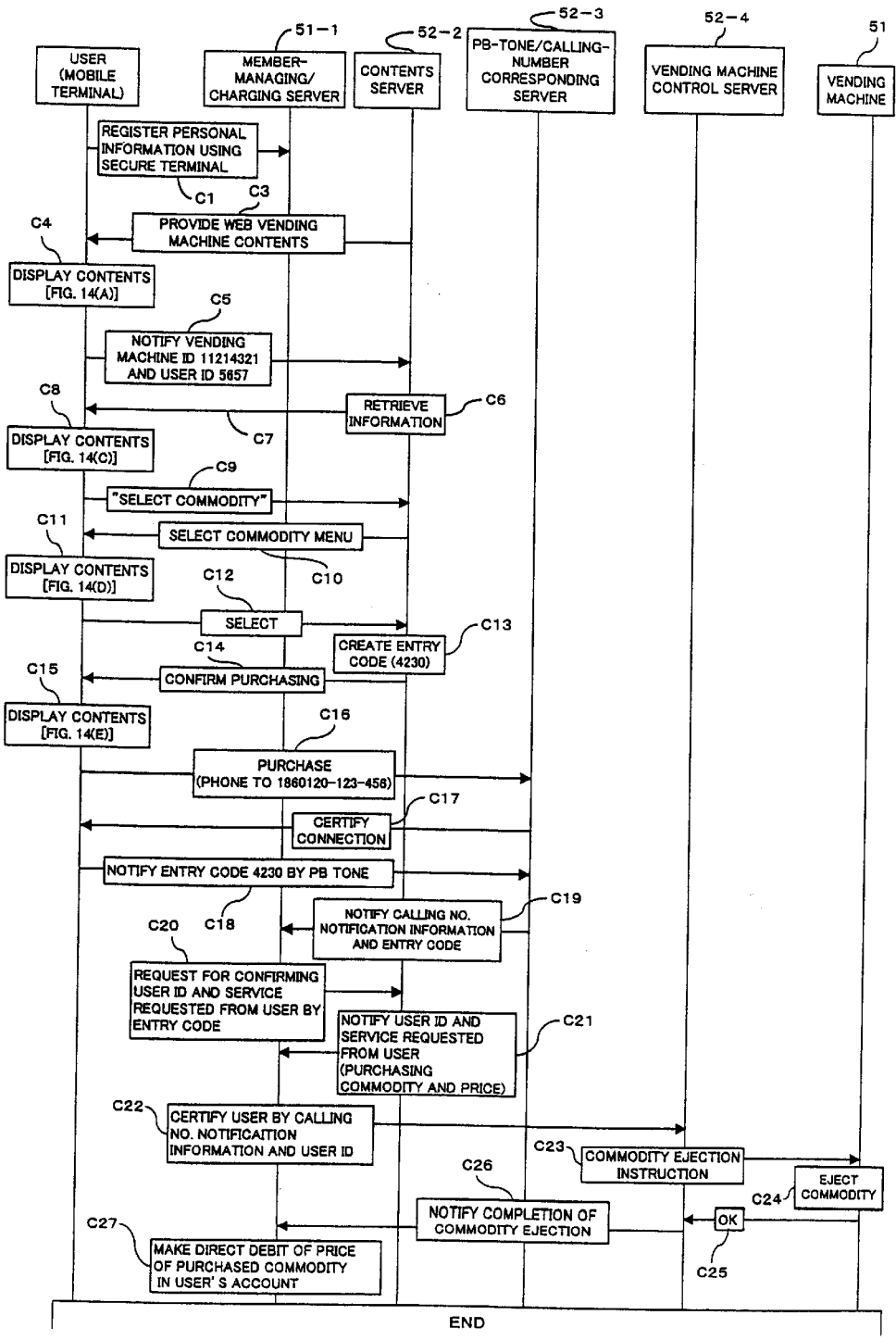
FIGS. 12 and 13 are flow diagrams respectively showing procedures of providing service in the WEB free system of FIG. 11.

Examples of the WEB free system 1" having above-mentioned elements will now be described with reference to flow diagrams of FIGS. 12 and 13.

First of all, a user (customer) applies to a service provider for membership and completes a registration of personal data, which is required for the membership registration to receive service via user's mobile telephone 2, using a terminal, such as a personal computer (PC), protected by an encryption technique of SSL (Secure Socket Layer), or over the counter communication (Step C1).

After the completion of the membership registration, when the user wishes to buy a commodity (e. g. beverage) from the vending machine 51, the user browses the Internet using the mobile telephone 2 to make an access to the contents server 52-2 in the vending machine control center 52 via the Internet line 4A and displays "WEB vending machine" contents on the LCD 6 to browse (Steps C3, C4).

At that time, for example, the contents server 52-2 provides the mobile telephone 2 with "inputting information"

contents (form), which has a vending machine inputting field 61 and a user ID inputting field 62 to be respectively input a vending machine ID and a user ID by the user, as "WEB vending machine services contents 6a via the Internet line 4A as shown in FIG. 14(A). As a result, the LCD 6 of the mobile telephone 2 displays the "inputting information" contents.

When the user inputs the vending machine ID (e.g., 112114321) and the user ID (e.g., 5657) respectively to the vending machine ID inputting field 61 and the user ID inputting field 62, as shown in FIG. 14(B), and then clicks a "sending" button 63, the information is sent to the vending machine control center 52 (the contents server 52-2) via the Internet line 4A (Step C5).

The operation (inputting information) by the user corresponds to the user's requesting to the vending machine control center 52 as a settlement agent's apparatus for use of a settlement service with respect to a price of a commodity that the user intends to buy and also corresponds to the user's sending of the user ID to the vending machine control center 52 from the mobile telephone 2 via the Internet line 4A as a first communication line. The operation of "click" means making a button on the LCD 6 selected state by operating the cursor buttons 10a through 10d (FIG. 2) and then pressing the decision button 9.

Then the contents server 52-2 specifies a vending machine 51 based on the vending machine ID received from the mobile telephone 2 via the Internet line 4A, and provide the mobile telephone 2 with "menu" contents 6c, which includes a "commodity selecting" button 64 and a "money inserting" button 65, via the Internet line 4A (Steps C6, C7).

It is assumed that the user selects (clicks) the "commodity selecting" button 64 during the display of "menu" contents 6c, which has been received by the mobile telephone 2, on the LCD 6 (Step C8).

Information regarding the selection is sent to the contents server 52-2 from the mobile telephone 2 via the Internet line 4A (Step C9), and whereupon the contents server 52-2 provides the mobile telephone 2 with "commodity selecting menu" contents (FIG. 14(D)), which is linked to the "commodity selecting" button 64, via the Internet line 4A (Step C10).

When the user selects a commodity, e.g., coffee, displayed (Step C11) in the "commodity selecting menu" contents 6d, information regarding the selection is sent to the contents server 52-2 via the Internet line 4A (Step C12). Subsequently, the contents server 52-2 creates "purchase confirming" contents 6e as shown in FIG. 14(E) and the entry code creating section 32a creates an "entry code" in accordance with the purchase confirming" contents 6e (Step C13).

The "entry code" is related with the "user ID" by the relating section 32c also in the illustrated embodiment, and thereby the contents server 52-2 creates a corresponding table likewise the corresponding table 321 of the FIG. 3(B) so that the contents server manages and grasps that a user having which user ID use which contents.

The "entry code" may consist of a simple combination of "user ID" and an ID code of "providing contents". Also in the illustrated example, it is preferable that the "entry code" of predetermined carries is automatically created since it is preferable that the "entry code" has several carries (e.g., "4230") due to notification confirming by PB tone as described later.

The contents server 52-2 provides the mobile telephone 2 with the "entry code ("4230")" and telephone number of the vending machine control center 52 by attaching them to a "purchase" button 66 in the "purchase confirming" contents 6e in the form of a hyperlink or the like, via the Internet line 4A (Step C14). If the user wishes to cancel the purchase of the commodity, the user clicks a "cancel" button 67 in the screen of FIG. 14(E) of the LCD 6 of the mobile telephone 2.

When the user makes a click operation with respect to the "purchase" button 66 (presses the decision button 11 with the "purchase" button selected), the phone-to detecting section 25a detects the click operation as a phone-to operation with respect to the telephone number ("044-123-4567"), which is attached to the "purchase" button 66, of the vending machine control center 52 and, as a result, the call-out operation to the telephone number is performed.

The contents server 52-2 attaches a code (e.g., "186") to the fore part of the telephone number ("044-123-4567") of the vending machine control center 52 for calling number notification setting so that the telephone number of the mobile phone 2 is notified to the vending machine control center 52 (the calling number notification setting of the mobile telephone 2 is carried out) upon the call-out operation.

If the telephone number of vending machine control center 52 is for a normal subscriber, it cost the user for toll (for communicating information via the public line 4B; for example 10 yen) each time when the user intends to buy a commodity from the vending machine 51 using the mobile telephone 2 in the illustrated embodiment. As a solution, it is preferable that the user calls vending machine control center 52 using the toll-free service, in which the telephone number begins with a dedicated code, such as "0120", or the collect call service, which charges a receiver of a phone call. Otherwise, if the system 1" does not make use of such services, the service provider may pay for the cost for a phone call by subtracting the cost for a phone call from the price regarding the purchase of a commodity upon the settlement, as described later.

It is assumed that the user clicks the "purchase" button 66 during the display of the "purchase confirming" contents 6e on the LCD 6 of the mobile telephone 2 as shown in FIG. 14(E) (the state of receiving the "entry code" in the entry code receiving section 26b, which is described with reference to FIG. 1; Step C15).

The phone-to detecting section 25a detects the click operation as a phone-to operation with respect to the telephone number ("044-123-4567"), which is attached to the "purchase" button 66, of the vending machine control center 52 and the call-out operation with respect to the telephone number is automatically performed (Step C16).

At that time, the telephone number (terminal ID) of the mobile telephone 2 is also sent to (notified) the vending machine control center 52 by the calling number notification setting. Namely, the Step C16 corresponds to a step of sending terminal ID from the mobile telephone 2 to the vending machine control center 52 via the public line 4B as a second communication line.

Upon a certification of a connection with the vending machine control center 52 (the PB-tone/calling-number corresponding server 52-4) (Step C17), the mobile telephone 2 automatically or manually sends the "entry code ("4230")" from the entry code notifying section 26c (Step C18), which is described with reference to FIG. 1.

The "entry code" is translated into the corresponding PB tone in the exchange 42 of the public line network 4B in the manner described with reference to FIG. 4, and whereupon the vending machine control center 52 receives it in the form of PB tone. The PB-tone/calling-number corresponding server 52-4 may request the user to input the "entry code" for sending it to the vending machine control center 52 by an automatic voice answering in the same manner as described in the first and the second embodiments.

The information in the form of the PB tone is detected in the PB-tone/calling-number detecting/analyzing unit 52-5 and then is received by the PB-tone/calling-number corresponding server 52-4, which notifies the member-managing/charging server 52-1 of the "entry code ("4230")" together with the calling number notification information from the mobile telephone 2 (Step C19).

The member-managing/charging server 52-1 passes the notified "entry code" to the contents server 52-2 to request a certification of the user ID and the service requested from the user (Step C20). Upon receipt of the request, the contents server 52-2 verifies (specifies) the "user ID" and providing contents ("purchase confirming" contents 6*e*; i.e., purchased commodity, price, etc.) corresponding to the "entry code" with reference to the corresponding table, exemplified by a table of FIG. 3(B), by the specifying section 32*d*, and the specified result is provided member-managing/charging server 52-1 (Step C21).

The member-managing/charging server 52-1 specifies personal data of the user by collating the "calling number notification information", which has been received from the mobile telephone 2 via the public line 4B and has been received from the PB-tone/calling-number corresponding server 52-3, and the "user ID", which has been received from the mobile telephone 2 via the Internet line 4A and has been notified by the contents server 52-2, with the user registration information restored in the member registering database 321, and thereby verifies the use of the "WEB vending machine service" ("settlement of a commodity" service) of the user (Step C22; verification step).

The member-managing/charging server 52-1 notifies the vending machine 51 of the result of the verification, together with information about the commodity (e.g., a canned coffee), as a commodity ejection instruction online (via the vending machine managing network 4D) (Step C23; verification result notifying step). Upon receiving the instruction, the vending machine 51 ejects the commodity (a canned coffee) (Step C24).

When the commodity is ejected normally, the vending machine 51 notifies the vending machine control center 52 (the vending machine control server 52-4) of the result of the ejection (OK) (Step C25) in return for the instruction. And upon receipt of the result of the normal ejection, the vending machine control server 52-4 notifies the member-managing/charging server 52-2 of a notification of commodity ejection (Step C26).

Upon receipt of the notification of commodity ejection, the member-managing/charging server 52-2 makes a direct debit (settlement) of the price of the commodity, which has been notified by the contents server 52-2 in Step C21, purchased by the "WEB vending machine service" in the account assigned by the user (Step C27). Conversely, when the commodity is not ejected normally resulted from, for example, a lack of stock, malfunction, or etc., the result (NG) of the ejection is notified to the member-managing/charging server 52-1 from the vending machine control server 51-4 and the settlement of the price is not made. The state (a lack of stock, malfunction, or etc.) causes the fault ejection may be notified to the mobile telephone 2, or may be displayed on the vending machine 51.

With above-mentioned manner, the user can buy a commodity from the vending machine 51 without inserting money.

Figure 13:
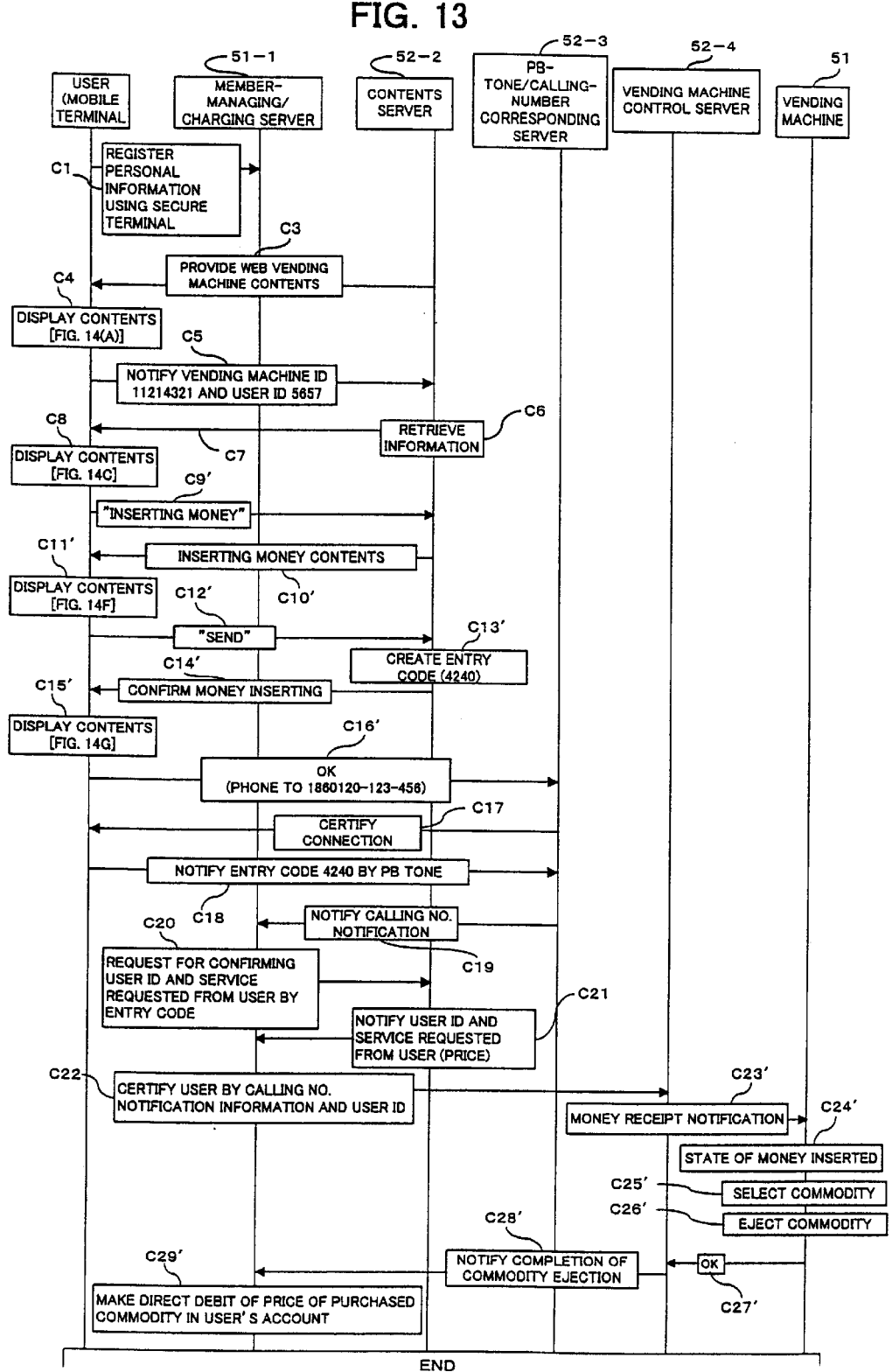

Meanwhile, when the user selects (clicks) a "money inserting" button 65 during the display of the "menu" contents 6*c* of FIG. 14(C) on the LCD 6 of the mobile telephone 2 at Step C8, the system 1" performs Steps C9' through C29', which follow Step 8, as shown in FIG. 13. Steps C1 through C8 in the FIG. 13 are identical in operation with steps designated same reference numbers in FIG. 12.

When the "money inserting" button 65 is clicked, the information is sent to the contents server 52-2 from the mobile telephone 2 via the Internet line 4A (Step C9') and whereupon the contents server 52-2 provides the mobile telephone 2 with "money inserting" contents 6*f* (FIG. 14(F)), which is linked to the "commodity selecting" button 64, via the Internet line 4A (Step C10').

With reference to the "money inserting" contents 6*f* on the LCD 6 (Step C11'), the user inputs an amount of money (e.g., 120 yen) to a price inputting field 68 and then clicks a "sending" button 69. Subsequently, the information about the amount of money to be inserted is sent to the contents server 52-2 via the Internet line 4A, as shown in FIG. 14(G) (Step c12').

Upon receipt of the information, the contents server 52-2 creates "money insert confirming" contents 6*g*, and makes the entry code creating section 32*a* create an "entry code ("4240")" corresponding to the "money insert confirming" contents 6*g*, as shown in FIG. 14(G) (Step C13').

Also in this case, the "entry code" is related with the "user ID" by the relating section 32*c*. The user inputs the amount of money to be inserted in the illustrated example. Alternatively, the contents server 52-2 may provide the mobile telephone 2 with alternative "money insert confirming" 6*g* contents which is previously inputted an amount money to be inserted by the contents server 52-2 or "inserting money amount menu" contents on which the user selects an amount of money to be inserted among some alternatives.

The contents server 52-2 provides the mobile telephone 2 with the "entry code ("4240")" and telephone number of the vending machine control center 52 ("0120-123-456") by attaching them to a "OK" button 66 in the "money insert confirming" contents 6*g* in the form of a hyperlink or the like, via the Internet line 4A (Step C14'). If the user wishes to cancel the purchase of the commodity, the user clicks a "cancel" button 71 in the screen of FIG. 14(G) of the LCD 6 of the mobile telephone 2.

When the user makes a click operation with respect to the "OK" button 70 in the illustrated example, the phone-to detecting section 25*a* detects the click operation as a phone-to operation with respect to the telephone number ("0120-123-456"), which is attached to the "OK" button 70, of the vending machine control center 52 and the call-out operation to the telephone number is performed.

The contents server 52-2 attaches a code (e.g., "186") to the fore part of the telephone number ("0120-123-456") of the vending machine control center 52 for calling number notification setting so that the telephone number of the mobile phone 2 is notified the vending machine control center 52 (the calling number notification setting of the mobile telephone 2 is carried out) upon the call-out operation.

It is assumed that the user clicks the "OK" button 70 during the display of the "money insert confirming" contents 6*g* of FIG. 14(G) of the LCD 6 of the mobile telephone 2 (Step C15'). The phone-to detecting section 25*a* detects the click operation as a phone-to operation with respect to the telephone number ("0120-123-456"), which is attached to the "OK" button 70, of the vending machine control center 52 and the call-out operation with respect to the telephone number is automatically performed (Step C16').

Upon confirming the connection with the vending machine control center 52 (the PB-tone/calling-number corresponding server 52-4) (Step C17), the mobile telephone 2 automatically or manually sends the "entry code ("4240")" (Step C18) in the same manner as when the "commodity selecting button" 64 is clicked at Step C8.

The "user ID" and the "providing contents" (the money insert confirming" contents 6g; amount of money inserted) which are corresponding to the "entry code ("4240") " are specified in the vending machine managing center 52, and the member-managing/charging server 52-1 verifies the use of the "WEB vending machine" service ("settlement" service) of the user (Steps C19 through C22).

The member-managing/charging server 52-1 notifies the vending machine 51 of the result of the verification as a price receipt notification online (via the vending machine managing network 4D) (Step C23') so as to make the vending machine 51 a state that money is inserted (received). As a result, the vending machine 51 becomes the state that money is inserted (Step C24'). At that time, when user selects a desired commodity by pressing a button on the vending machine 51 corresponding to the desired commodity as a common practice, the vending machine 51 ejects the commodity so that the user receives the commodity (Step C26').

According to the third embodiment, the user can make a commodity eject from the vending machine 51 by selecting the commodity over the contents in the "WEB vending machine service", or by inputting the price of a desired commodity and thereby making the vending machine 51 the state that money is inserted.

When the commodity is ejected normally, the vending machine 51 notifies the vending machine control center 52 (the vending machine control server 52-4) of the result of the ejection (OK) (Step C27') also in this case. And upon receipt of the result of the normal ejection, the vending machine control server 52-4 notifies the member-managing/charging server 52-1 of a notification of commodity ejection (Step C28').

Upon receipt of the notification of commodity ejection, the member-managing/charging server 52-1 makes a direct debit (settlement) of the price of the commodity (the amount of money notified by the contents server 52-2 in Step C21 in FIG. 13) purchased in the "WEB vending machine service" in the account assigned by the user (Step C29'). Conversely, when the commodity is not ejected normally resulted from, for example, a lack of stock, malfunction, or etc., the result (NG) of the ejection is notified the member-managing/ charging server 52-1 from the vending machine control server 51-4 and the settlement of the price is not made. The state (a lack of stock, malfunction, or etc.) causes the fault ejection may be notified the mobile telephone 2, or may be displayed on the vending machine 51.

After the completion of the "Web vending machine" service, the member-managing/charging server 52-1 retrieves an e-mail address of the user in the member registration database 311 or etc. and notifies the user the completion of the service (purchased commodity, quantity, slip of price of which the member-managing/charging server 52-1 makes a direct debit) by sending an e-mail to the mobile telephone 2. Such "sending e-mail" service can be realized by installing the mail server 38, which has been mentioned in the first and the second embodiments, in the system 1". The service may be, of course, performed by the mails.

Since the "user ID" and the telephone number of the mobile telephone 2 is notified the vending machine control center 52 of a service provider respectively via the Internet line 4A and the public line 4B, which are respective different lines, it is possible to correctly verify the use of the service for the user of the mobile telephone 2 by specifying the user even if the mobile telephone 2 does not have a function of special encryption technique, such as SSL, or even if the telephone number of the mobile telephone 2 is reused, same as the first and the second embodiment. As a result, the user can purchase a commodity from the vending machine 51 using only the mobile telephone 2.

When the user selects a commodity in the "commodity selecting menu" contents 6d of FIG. 14(D), the "purchase confirming" contents 6e of FIG. 14(E) is provided for the mobile telephone 2 in the illustrated embodiment. Alternatively, the "money inserting" contents 6f of FIG. 14(F) (or the "money insert confirming" contents 6g of FIG. 14(G)) may be provided the mobile telephone after the selection of a commodity.

The price settlement for the commodity may be performed not only by making a direct debit in the user's bank account in real time but also by sending the user a form for remittance to a banking agent in later day. The settlement manner is also applied to the first and the second embodiments.

The user inputs the vending machine ID by a manual operation in the illustrated embodiment. Alternatively, the mobile telephone 2 receives the vending machine ID from the vending machine 51 using a infrared data communication function which is installed in the mobile telephone 2; or, when the vending machine ID is displayed in the form of a bar code tag, the mobile terminal 2 may read the bar code using a function as a bar-code reader of the mobile telephone 2 (or using an external bar-code reader).

The mobile telephone 2 may register some vending machine IDs likewise a function of redial or bookmark, or may display an ID of a particular vending machine 51 which the user uses frequently in the first place. With such manner, it is possible to reduce the use's labor when the user purchases a commodity from the vending machine 51, which the user uses frequently. Further, if the vending machine ID is registered in the mobile telephone 2 in the form of a name familiar to the user, such as the installation place, the brand, or the name of a commodity sold in the vending machine, it is possible to further improve the service to the user.

It is assumed that the vending machine 51 sells a commodity by inserted money as a normal practice and by the above-mentioned "WEB vending machine" service in the illustrated embodiment. The vending machine 51 may be, of course, dedicated to the "WEB vending machine" service.

Further, it is possible for the user to omit operations of inputting and sending information of FIG. 14(A) through 14(C) by using technique disclosed in Japanese Patent Application No. 2000-318537 (hereinafter called the prior application).

The prior application discloses technique that, when the mobile telephone 2 (the antenna) is directed to some direction, the information about a building or an object which are located in the space of the direction is automatically provided for the mobile telephone 2. It does not matter whether the building and the object stand still or are moving, and the information is about the name of the building, name of a shop located in the building, a commodity dealt in the shop, or etc.

In the prior application, the mobile telephone 2 is equipped with a function of a GPS (global positioning system), a geomagnetic sensor, an inclination sensor, or etc. so that the mobile telephone recognizes its positioning information and posturing information in the natural space (three-dimensional space). Concurrently, a database in which the information about the space occupation information (a latitude, a longitude, an altitude, etc.) of an object in the natural space related with information about the object (e.g., WEB contents (URL; Uniform Resource Locator) is constructed in a server.

With such mobile telephone 2 and such server, when the mobile telephone 2 sends the server the current positioning information and posturing information, the server retrieves WEB contents corresponding to the positioning and posturing information of the mobile telephone 2 in the database so as to provide the mobile telephone 2 with the WEB contents.

As a result, when the present invention combines with the technique of the prior application, the user automatically obtains information about a commodity sold in the vending machine 51, information such as the "commodity selecting menu" contents 6d of FIG. 14(D) or the "money inserting" contents of FIG. 14(F), only by directing the mobile telephone 2 to the vending machine 51, in which the user is going to make a purchase, without above-mentioned operations. Therefore, it is possible to further improve the service to the customer upon the use of the "WEB vending machine service".

In the illustrated third embodiment, the user buys a commodity from the vending machine 51 ("WEB vending machine service") using the mobile telephone 2 as the use of a providing service. The providing service should by no means limited to purchasing a commodity from the vending machine 51; alternatively, the providing service may be used when a user purchases a commodity in a commodity selling shop, such as a department store, a supermarket, or convenience store, or when a user receives a commodity sent by cash on receipt or delivered via a transportation company.

When a user buys a commodity in a commodity selling shop, an ID which has been previously assigned to a cash register is sent by the mobile telephone 2 and then the result of verification is notified the register. As a result, the user makes a purchase of a commodity as an authorized receiver for the service. When the user receives a commodity sent or delivered, an ID which has been previously assigned to the commodity is send by the mobile telephone 2 and then the result of verification is notified a terminal (or a mobile telephone) functions as a settlement terminal carried by a delivery person by an e-mail or other means. As a result, the user receives the commodity.

Namely, it is possible for the user of the mobile telephone 2 to buy any commodity using the mobile telephone 2 as a substitution for a purse or a credit card only if the user is subscribed to the service provided on the WEB.

The member-managing/charging server 52-1, the contents server 52-2, the PB-tone/calling number corresponding server 52-3, and the vending machine control server 52-4 may be disposed in respective different places or may be decentralized within a network also in the third embodiment.

Further, the user receives services using a mobile telephone (mobile radio terminal) 2 as an information terminal throughout the specification. However, the present invention should by no means limited to the use of the mobile telephone 2. Alternatively, it is, of course, possible to use any information terminal having functions of voice communication and data communication. Still further, the present invention is not limited to these foregoing embodiments, but various variations and modifications may be suggested without departing from the concept of the present invention.

What is claimed is:

1. A service providing method using an information terminal, said method comprising the steps of:

at a service providing apparatus using both previously registered user identification (ID) information about a user of an information terminal and previously registered terminal ID information peculiar to the information terminal (a) creating an individual code peculiar to user input information, which has been inputted to the information terminal in accordance with a service requested by the user of the information terminal and has been received from the information terminal via first line;

(b) sending said individual code, which has been created in said individual code creating step (a), to the information terminal via said first line;

at the information terminal (c) notifying the service providing apparatus of said individual code, which has been received from the service providing apparatus via said first line, via a second line;

at the service providing apparatus (d) specifying user input information corresponding to said individual code, which has been notified by the information terminal via said second line;

(e) specifying personal data of the user of the information terminal, based on both said user ID information received from the information terminal via said first line and said terminal ID information received from the information terminal via said second line; and (f) executing a desired service for the user of the information terminal based on both said user input information specified in said user input information specifying step (d) and said personal data specified in said personal data specifying step (e).

2. A service providing apparatus for an information terminal, said apparatus comprising:

individual code creating means for creating an individual code peculiar to user input information, which bias been inputted to the information terminal in accordance with a service requested by a user of the information terminal and has been received from the information terminal via a first line;

individual code sending means for sending said individual code, which has been created by said individual code creating means, to the information terminal via aid first line;

user input information specifying means for specifying user input information corresponding to said individual code, which is notified by the information terminal via a second line;

verifying means for specifying the user of the information terminal based on user identification (ID) information received from the information terminal via said first line and terminal identification (ID) information of the information terminal received from the information terminal via said second line; and service executing means for executing a desired service for the user of the information terminal based on said user input information specified by said user input information specifying means and personal information of the user specified by said verifying means.

3. An information terminal comprising:

individual code receiving means for receiving an individual code peculiar to user input information, which has been inputted to said information terminal in accordance with a service requested by a user of said information terminal, said individual code having been created in a service providing apparatus and sent to said information terminal via said first line;

individual code notifying means for notifying the service providing apparatus of said individual code, which has been received by said individual code receiving means, via a second line so that the service providing apparatus specifics said user input information based on said individual code; and verifying information transmitting means for transmitting at least two kinds of information pieces via said different first and second lines respectively, said information pieces are used in said service providing apparatus, for verifying the user of said information terminal to which is inputted said user input information and for specifying personal information, which should be used in combination with the user input information specified by said individual code, to provide a service based on the specified user input information and personal information.

4. An information terminal according to claim 3, wherein said verifying information transmitting means comprising:

user identification (ID) information sending means for sending user ID information about the service as one of said verifying information pieces to said service providing apparatus via said first line; and terminal ID information sending means for sending terminal ID information as another of said verifying information to said verifying unit via said second line.

5. A service providing method using an information terminal, said method comprising the steps of:

at a service providing apparatus using both previously registered user identification (ID) information about a user of an information terminal and previously registered terminal ID information peculiar to the information terminal (a) creating an individual code peculiar to providing information for the information terminal;

(b) sending said individual code, which has been created in said individual code creating step (a), together with said providing information to the information terminal via a first line;

at the information terminal (c) notifying the service providing apparatus of said individual code, which has been received from the service providing apparatus via said first line, via a second line;

at the service providing apparatus (d) specifying providing information corresponding to said individual code, which has been notified by the information terminal via said second line;

(e) specifying personal data of the user of the information terminal based on both said user ID information received from the information terminal via said first line and said terminal ID information received from said information terminal via said second line; and (f) executing a desired service based on both said providing information specified in said providing information specifying step (d) and said personal data specified in said personal data specifying step (e).

6. A service providing apparatus for an information terminal, said apparatus comprising:

individual code creating means for creating an individual code peculiar to providing information for the information terminal;

individual code sending means for sending said individual code, which has been created by said individual code creating means, to the information terminal via a first line;

providing information specifying means for specifying providing information corresponding to said individual code, which has been notified by the information terminal via a second line;

verifying means for verifying and specifying a user of said information terminal based on user identification (ID) information received from said information terminal via said first line and terminal ID information received from said information terminal via said second line; and service executing means for executing a desired service based on said providing information specified by said providing information specifying means and personal information of the user specified by said verifying means.

7. An information terminal comprising:

individual code receiving means for receiving an individual code peculiar to providing information for said information terminal, which code has been created in a service providing apparatus and has been received together with said providing information from the service providing apparatus via a first line;

individual code notifying means for notifying the service providing apparatus of said individual code, which has been received by said individual code receiving means, via a second line so that the service providing apparatus specifies said providing information based on said individual code; and verifying information transmitting means for transmitting at least two kinds of information pieces via said different first and second lines respectively, said information pieces are used in said service providing apparatus, for verifying the user of said information terminal to which is received said providing information and for specifying personal information, which should be used in combination with said providing information specified by said individual code, to provide a service based on the specified providing information and personal information.

8. An information terminal according to claim 7, wherein said verifying information transmitting means comprising:

user identification (ID) information sending means for sending user ID information about the service, as one of said verifying information to said service providing apparatus via said first line; and terminal ID information sending means for sending terminal ID information as another of said verifying information to said service providing apparatus via said second line.

9. An information terminal according to claim 8, wherein the service is a settlement service with respect to a price of a commodity that a user of said information terminal intends to buy.

10. A service verifying apparatus for verifying use of a service performed by using an information terminal based on user identification (ID) information and terminal ID information, which are received from the information terminal comprising:

user identification (ID) information sending means for sending user ID information about the service, which is to be provided, to said verifying apparatus, which discriminates whether the service should be provided for the information terminal, via a first line;

terminal ID information sending means for sending terminal ID information to said verifying apparatus via a second line;

user registration information managing means for managing, as user registration information about a user of the information terminal with respect to a service requested by the user, user identification (ID) information and terminal ID information peculiar to the information terminal; and verifying means for verifying the use of the service requested by the user by collating user ID information, which has been received from the information terminal via a first line, and terminal ID information, which has been received from the information terminal via second line, with the user registration information, which is managed in said user registration information managing means.

11. A service verifying apparatus for verifying use of a service performed by using an information terminal based on user identification (ID) information and terminal ID information, which are received from the information terminal comprising:

user identification (ID) information sending means for sending user ID information about the service, which is to be provided to said verifying apparatus which discriminates whether the service should be provided for the information terminal, via a first line, the service being a settlement service with respect to a price of a commodity that a user of the information terminal intends to buy;

terminal ID information sending means for sending terminal ID information to said verifying apparatus via second line;

user registration information managing means for managing, as user registration information about a user of the information terminal with respect to a service requested by the user, user identification (ID) information and terminal ID information peculiar to the information terminal; and verifying means for verifying the use of the service requested by the user by collating user ID information, which has been received from the information terminal via a first line, and terminal ID information, which has been received from the information terminal via a second line, with the user registration information, which is managed in said user registration information managing means.

12. A service providing system comprising:

a service verifying apparatus for verifying use of a service performed by using an information terminal based on user identification (ID) information and terminal ID information, which are received from the information terminal, said service verifying apparatus including:

user identification (ID) information sending means for sending user ID information about the service, which is to be provided, to said verifying apparatus, which discriminates whether the service should be provided for the information terminal, via a first line;

terminal ID information sending means for sending terminal ID information to said verifying apparatus via a second line;

user registration information managing means for managing, as user registration information about a user of the information terminal with respect to a service requested by the user, user identification (D) and terminal ID information peculiar to the information terminal; and verifying means for verifying the use of the service requested by the user by collating user ID information, which has been received from the information terminal via a first line, and terminal ID information, which has been received from the information terminal via second line, with the user registration information, which is managed in said user registration information managing means; and a service providing apparatus for receiving the result of verification from said service verifying apparatus to provide the service to said information terminal based on the result of verification.

13. A service providing system comprising:

a service verifying apparatus for verifying use of a service performed by using an information terminal based on user identification (ID) information and terminal ID information, which are received from the information terminal, said service verifying apparatus including:

user identification (ID) information sending means for sending user ID information about the service, which is to be provided, to said verifying apparatus which discriminates whether the service should be provided for the information terminal, via a first line, the service being a settlement service with respect to a price of a commodity that a user of the information terminal intends to buy;

terminal ID information sending means for sending terminal ID information to said verifying apparatus via second line;

user registration information managing means for managing, as user registration information about a user of the information terminal with respect to a service requested by the user, user identification (ID) information and terminal ID information peculiar to the information terminal; and verifying means for verifying the use of the service requested by the user by collating user ID information, which has been received from the information terminal via a first line, and terminal ID information, which has been received from the information terminal via a second line, with the user registration information, which is managed in said user registration information managing means; and a service providing apparatus for receiving the result of verification from said service verifying apparatus to provide the service to said information terminal based on the result of verification.

14. A service providing system according to claim 12, wherein said service providing apparatus is a settlement agent apparatus, responsive to the result of verification, for executing a settlement service with respect to a price of a commodity that the user of the information terminal intends to buy.

15. A service providing system according to claim 13, wherein said service providing apparatus is a settlement agent apparatus, responsive to the result of verification, for executing a settlement service with respect to a price of a commodity that the user of the information terminal intends to buy.

16. A service providing system according to claim 12, wherein said service providing apparatus is a commodity selling apparatus responsive to the result of verification, for executing a commodity selling service.

17. A service providing system according to claim 13, wherein said service providing apparatus is a commodity selling apparatus, responsive to the result of verification, for executing a commodity selling service.

18. A method of buying a commodity using an information terminal, comprising the steps of:

at the information terminal receiving an individual code via a first line, said individual code peculiar to a commodity that the user of the information intends to buy;

(b) sending said individual code via a second line to a settlement agent apparatus for use by a settlement service with respect to a price of said commodity;

(c) sending user identification (ID) information to the settlement agent apparatus via said first line;

(d) sending terminal ID information of the information terminal to the settlement agent apparatus via said second line;

at the settlement agent apparatus (e) verifying the use of said settlement service for said commodity by collating said user (ID) information, which has been received from the information terminal via said first line, and said individual code and said terminal ID information, each of which has been received from the information terminal via said second line, with previously registered user registration information about the settlement service; and (f) notifying a settlement apparatus of the result of verification in said verifying step (d) so that the settlement apparatus settles the price of the commodity based on said result of verification.

19. A method of buying a commodity using an information terminal according to claim 18, wherein said settlement apparatus is a commodity selling apparatus, responsive to the result of verification, for ejecting commodity.

20. A method of buying a commodity using an information terminal according to claim 18, wherein said settlement apparatus is a commodity selling apparatus, responsive to the result of verification, for becoming a state that money is inserted.

* * * * *